(12) United States Patent
Yoneda et al.

(10) Patent No.: US 11,637,293 B2
(45) Date of Patent: Apr. 25, 2023

(54) METHOD FOR MANUFACTURING LITHIUM-CONTAINING COMPLEX PHOSPHATE ELLIPTICAL PARTICLES

(71) Applicant: SEMICONDUCTOR ENERGY LABORATORY CO., LTD., Atsugi (JP)

(72) Inventors: Yumiko Yoneda, Kanagawa (JP); Takuya Miwa, Mie (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 273 days.

(21) Appl. No.: 16/892,582

(22) Filed: Jun. 4, 2020

(65) Prior Publication Data

US 2020/0295382 A1   Sep. 17, 2020

Related U.S. Application Data

(62) Division of application No. 15/638,444, filed on Jun. 30, 2017, now abandoned.

(30) Foreign Application Priority Data

Jul. 8, 2016 (JP) ................................ 2016-135709

(51) Int. Cl.
  *H01M 6/10* (2006.01)
  *H01M 4/1397* (2010.01)
  (Continued)

(52) U.S. Cl.
  CPC ........... *H01M 6/10* (2013.01); *H01M 4/1397* (2013.01); *H01M 4/364* (2013.01);
  (Continued)

(58) Field of Classification Search
  CPC ... H01M 4/1397; H01M 4/364; H01M 4/5825
  (Continued)

(56) References Cited

U.S. PATENT DOCUMENTS

| 8,476,477 B2 | 6/2013 | Miwa et al. |
| 8,501,011 B2 | 8/2013 | Felch |

(Continued)

FOREIGN PATENT DOCUMENTS

| CN | 102311110 B | * | 1/2013 | ............. C01B 25/45 |
| JP | 2004-095385 A | | 3/2004 | |

(Continued)

*Primary Examiner* — Sean P Cullen
(74) *Attorney, Agent, or Firm* — Nixon Peabody LLP; Jeffrey L. Costellia

(57) ABSTRACT

A positive electrode active material includes a plurality of groups of particles. The plurality of groups of particles has a particle diameter of more than or equal to 300 nm and less than or equal to 3 μm. Each of the groups includes two or more particles. The two or more particles are each a lithium-containing complex phosphate including one or more of iron, nickel, manganese, and cobalt. The group of particles includes a first particle and a second particle each having a major diameter and a minor diameter in the upper surface when seen from a predetermined direction. The major diameters of the first and second particles are substantially parallel to each other. The major diameter of the first particle is two to six times larger than the minor diameter of the first particle and the minor diameter of the first particle is more than or equal to 20 nm and less than or equal to 130 nm.

6 Claims, 29 Drawing Sheets

(51) Int. Cl.
*H01M 4/36* (2006.01)
*H01M 50/538* (2021.01)
*H01M 4/58* (2010.01)
*H01M 10/04* (2006.01)
*H01M 10/052* (2010.01)
*H01M 4/02* (2006.01)
*H01M 10/42* (2006.01)
*H01M 10/0525* (2010.01)

(52) U.S. Cl.
CPC ..... *H01M 4/5825* (2013.01); *H01M 10/0431* (2013.01); *H01M 50/538* (2021.01); *H01M 10/052* (2013.01); *H01M 10/0525* (2013.01); *H01M 2004/028* (2013.01); *H01M 2010/4278* (2013.01); *H01M 2220/10* (2013.01); *H01M 2220/20* (2013.01); *H01M 2220/30* (2013.01); *Y02E 60/10* (2013.01)

(58) Field of Classification Search
USPC ....................................................... 429/231.3
See application file for complete search history.

(56) References Cited

U.S. PATENT DOCUMENTS

| | | | |
|---|---|---|---|
| 8,685,570 | B2 | 4/2014 | Miwa et al. |
| 9,118,077 | B2 | 8/2015 | Miwa et al. |
| 9,249,524 | B2 | 2/2016 | Miwa et al. |
| 9,315,401 | B2 | 4/2016 | Felch |
| 9,711,292 | B2 | 7/2017 | Miwa et al. |
| 10,985,369 | B2 * | 4/2021 | Miwa .................. H01M 4/5825 |
| 2009/0155689 | A1 | 6/2009 | Zaghib et al. |
| 2010/0233538 | A1 | 9/2010 | Nesper et al. |
| 2011/0031105 | A1 | 2/2011 | Miyanaga |
| 2011/0037032 | A1 | 2/2011 | Hibst et al. |
| 2012/0183839 | A1 | 7/2012 | Yuasa et al. |
| 2012/0237426 | A1 | 9/2012 | Futamura |
| 2013/0065120 | A1 | 3/2013 | Miwa et al. |
| 2013/0202946 | A1 | 8/2013 | Choy et al. |
| 2014/0004425 | A1 | 1/2014 | Oono et al. |
| 2015/0093580 | A1 | 4/2015 | Kobayashi et al. |
| 2015/0118559 | A1 | 4/2015 | Ito et al. |
| 2015/0125751 | A1 | 5/2015 | Futamura |
| 2016/0049657 | A1 | 2/2016 | Forbert |
| 2016/0079600 | A1 | 3/2016 | Miwa et al. |
| 2017/0256785 | A1 | 9/2017 | Oguni et al. |
| 2017/0338489 | A1 | 11/2017 | Miwa et al. |
| 2021/0226216 | A1 * | 7/2021 | Miwa ..................... C01B 25/45 |

FOREIGN PATENT DOCUMENTS

| | | |
|---|---|---|
| JP | 2008-066019 A | 3/2008 |
| JP | 2010-168230 A | 8/2010 |
| JP | 2011-071018 A | 4/2011 |
| JP | 2011-181293 A | 9/2011 |
| JP | 2011-181452 A | 9/2011 |
| JP | 2012-123909 A | 6/2012 |
| JP | 2013-054922 A | 3/2013 |
| JP | 2013-089393 A | 5/2013 |
| JP | 2015-049997 A | 3/2015 |
| WO | WO-2008/091578 | 7/2008 |
| WO | WO-2011/057646 | 5/2011 |

* cited by examiner

FIG. 10A
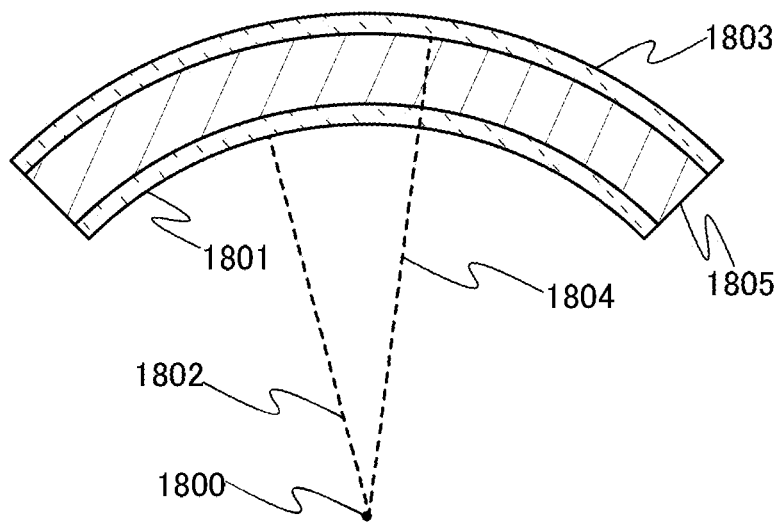
FIG. 10B
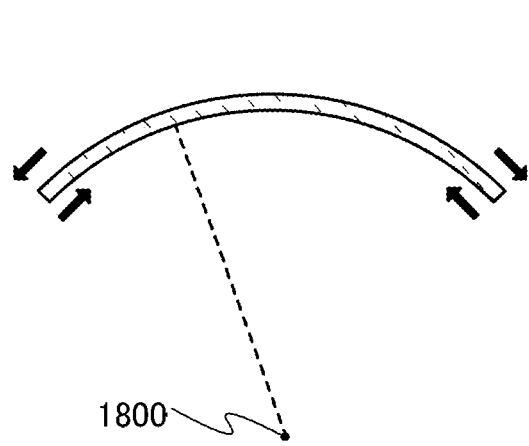
FIG. 10C
FIG. 10D
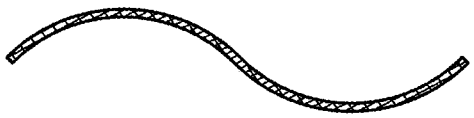

METHOD FOR MANUFACTURING LITHIUM-CONTAINING COMPLEX PHOSPHATE ELLIPTICAL PARTICLES

BACKGROUND OF THE INVENTION

1. Field of the Invention

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, a memory device, a driving method thereof a manufacturing method thereof, or an evaluation method thereof. In particular, one embodiment of the present invention relates to a power storage device, a manufacturing method thereof, and an evaluation method thereof. Alternatively, the present invention relates to a lithium-containing complex phosphate and a manufacturing method thereof. Alternatively, the present invention relates to a positive electrode active material and a manufacturing method thereof. Alternatively, the present invention relates to a lithium ion battery. Alternatively, the present invention relates to a battery management unit and an electronic device.

2. Description of the Related Art

The solubility in a solution at high temperature and under high pressure is higher than at normal temperature and under normal pressure. Furthermore, by controlling pH of the solution, the dissolution and precipitation of a material can be controlled (Patent Document 1). As an example of a reaction at high temperature and under high pressure, a hydrothermal method can be given.

In recent years, power storage devices such as lithium-ion secondary batteries have been developed. Examples of such power storage devices include a power storage device having an electrode formed using lithium iron phosphate ($LiFePO_4$), which is a composite oxide, as an active material. The power storage device having an electrode formed using $LiFePO_4$ has high thermal stability and favorable cycle characteristics.

As an example of a method for generating a composite oxide such as $LiFePO_4$, the hydrothermal method can be used (e.g., Patent Document 2).

By using the hydrothermal method, even a material which is less likely to be dissolved in water at normal temperatures and under normal pressures can be dissolved, and thus a substance which is hardly obtained by a production method performed at normal temperatures and under normal pressures can be synthesized or crystal growth of such a substance can be conducted. Furthermore, by using the hydrothermal method, microparticles of single crystals of a target substance can be easily synthesized.

The hydrothermal method, for example, enables a desired compound to be generated in the following manner: a solution containing a raw material is introduced into a container resistant to pressure and be subjected to pressure treatment and heat treatment; and the treated solution is filtered.

REFERENCES

[Patent Document 1] PCT International Publication No. 2008/091578
[Patent Document 2] Japanese Published Patent Application No. 2004-95385

SUMMARY OF THE INVENTION

An object of one embodiment of the present invention is to provide a composite oxide with high diffusion rate of lithium. Another object of one embodiment of the present invention is to provide a positive electrode active material with high diffusion rate of lithium. Another object of one embodiment of the present invention is to provide a power storage device with high output. Another object of one embodiment of the present invention is to provide a novel power storage device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

A positive electrode active material of one embodiment of the present invention includes a plurality of groups of particles. Each of the plurality of groups of particles has a particle diameter of more than or equal to 300 nm and less than or equal to 3 μm. Each of the groups includes two or more particles. The two or more particles are each a lithium-containing complex phosphate including one or more of iron, nickel, manganese, and cobalt. The first group of particles includes a first particle and a second particle each having a major diameter and a minor diameter in the upper surface when seen from a predetermined direction (for example, the upper surface observed with a microscope). The major diameters of the first particle and the second particle are substantially parallel to each other when seen from a predetermined direction. The major diameter of the first particle is two to six times larger than the minor diameter of the first particle and the minor diameter of the first particle is more than or equal to 20 nm and less than or equal to 130 nm.

A positive electrode active material of one embodiment of the present invention includes a plurality of particles. Each of the plurality of particles is a lithium-containing complex phosphate including one or more of iron, nickel, manganese, and cobalt. A first particle and a second particle of the positive electrode active material each have a major diameter and a minor diameter in the upper surface observed with a microscope. The major diameters of the first particle and the second particle are substantially parallel to each other when seen from a predetermined direction. The major diameter of the first particle is two to six times larger than the minor diameter of the first particle and the minor diameter of the first particle is more than or equal to 20 nm and less than or equal to 130 nm. A median value of the particle diameters obtained with use of a laser diffraction and scattering method is more than or equal to 500 nm and less than or equal to 6 μm.

A positive electrode active material of one embodiment of the present invention includes a plurality of particles. Each of the plurality of particles is a lithium-containing complex phosphate including one or more of iron, nickel, manganese, and cobalt. The first particle and the second particle of the positive electrode active material each include a major diameter and a minor diameter in the upper surface observed with a microscope. The major diameters of the first particle and the second particle are substantially parallel to each other when seen from a predetermined direction. The major diameter of the first particle is two to six times larger than the minor diameter of the first particle and the minor diameter of the first particle is more than or equal to 20 nm and less than or equal to 130 nm. A median value of the particle diameters obtained with use of a laser diffraction and scattering method is more than or equal to 500 nm and less than or equal to 6 μm. A specific surface area is more than or equal to 18 m$^2$/g and less than or equal to 50 m$^2$/g.

Furthermore, the above-mentioned positive electrode active material preferably has an olivine structure. The above-mentioned positive electrode active material is preferably represented by LiFePO$_4$.

Another embodiment of the present invention is a power storage device including a positive electrode comprising the positive electrode active material described in any one of the above descriptions and a negative electrode. Another embodiment of the present invention is an electronic device including the power storage device.

A manufacturing method of a positive electrode active material of one embodiment of the present invention includes a step of mixing a lithium compound, a phosphorus compound, and water to form a first mixed solution, a step of adjusting pH by adding a first aqueous solution to the first mixed solution to form a second mixed solution, a step of mixing an iron(II) compound with the second mixed solution to form a third mixed solution, and a step of heating the third mixed solution under a pressure higher than or equal to 0.1 MPa and lower than or equal to 2 MPa at a highest temperature higher than 150° C. and lower than or equal to 250° C. to form a fourth mixed solution. The positive electrode active material includes a plurality of particles and pH of the third mixed solution is more than or equal to 3.5 and less than or equal to 5.0. Each of the plurality of particles is a lithium-containing complex phosphate including one or more of iron, nickel, manganese, and cobalt. Each of a first particle and a second particle of the positive electrode active material includes a major diameter and a minor diameter in the upper surface observed with a microscope. The major diameters of the first particle and the second particle are substantially parallel to each other when seen from a predetermined direction. The major diameters of the first particle is two to six times larger than the minor diameter of the first particle and the minor diameters of the first particle is more than or equal to 20 nm and less than or equal to 130 nm. A median value of the particle diameters obtained with use of a laser diffraction and scattering method is more than or equal to 500 nm and less than or equal to 6 μm.

A manufacturing method of a positive electrode active material of one embodiment of the present invention includes a step of mixing a lithium compound, a phosphorus compound, and water to form a first mixed solution, a step of adjusting pH by adding a first aqueous solution to the first mixed solution to form a second mixed solution, a step of mixing an iron(II) compound with the second mixed solution to form a third mixed solution, and a step of heating the third mixed solution under a pressure higher than or equal to 0.1 MPa and lower than or equal to 2 MPa at a highest temperature higher than 150° C. and lower than or equal to 250° C. to form a fourth mixed solution. The positive electrode active material includes a plurality of particles and pH of the third mixed solution is more than or equal to 3.5 and less than or equal to 5.0. Each of the plurality of particles is a lithium-containing complex phosphate including one or more of iron, nickel, manganese, and cobalt. Each of a first particle and a second particle of the positive electrode active material includes a major diameter and a minor diameter in the upper surface observed with a microscope. The major diameter of the first particle and the second particle are substantially parallel to each other when seen from a predetermined direction. The major diameters of the first particle is two to six times larger than the minor diameter of the first particle and the minor diameters of the first particle is more than or equal to 20 nm and less than or equal to 130 nm. A median value of the particle diameter obtained with use of laser diffraction and scattering method is more than or equal to 500 nm and less than or equal to 6 μm. A specific surface area is more than or equal to 18 m$^2$/g and less than or equal to 50 m$^2$/g.

In the above-mentioned manufacturing method of a positive electrode active material, the positive electrode active material preferably has an olivine structure.

In the above-mentioned manufacturing method of a positive electrode active material, the positive electrode active material is preferably represented by LiFePO$_4$.

One embodiment of the present invention can provide a composite oxide with high diffusion rate of lithium. Another embodiment of the present invention can provide a positive electrode active material with high diffusion rate of lithium. According to one embodiment of the present invention, a power storage device with high output can be provided. Another embodiment of the present invention can provide a novel power storage device.

Note that one embodiment of the present invention is not limited to these effects. For example, depending on circumstances or conditions, one embodiment of the present invention might produce another effect. Furthermore, depending on circumstances or conditions, one embodiment of the present invention might not produce any of the above effects.

BRIEF DESCRIPTION OF THE DRAWINGS

In the accompanying drawings:

FIGS. 10A to 10D are each a diagram for illustrating a radius of curvature of a film;

FIGS. 19A-1, 19A-2, 19B-1, and 19B-2 illustrate examples of power storage systems;

DETAILED DESCRIPTION OF HE INVENTION

Figure 1A:
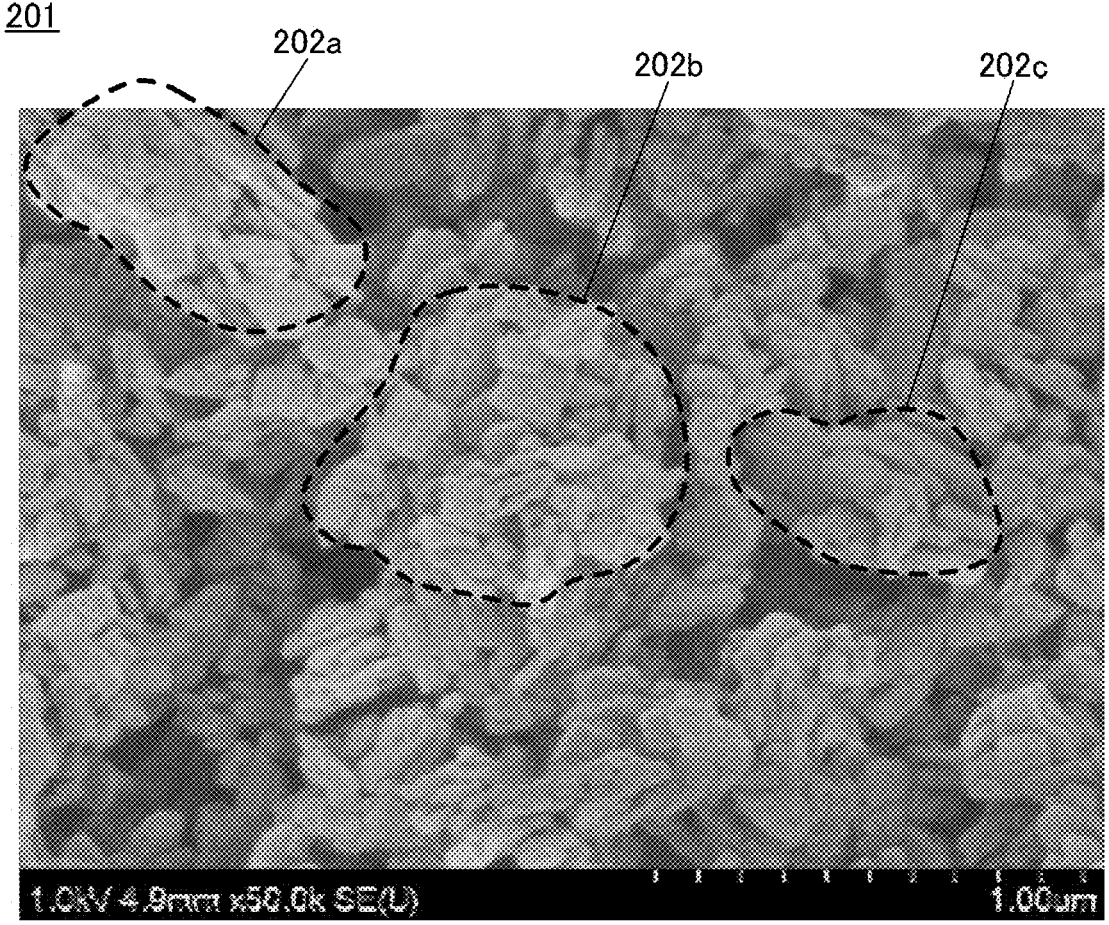
FIGS. 1A and 1B illustrate a positive electrode active material.

Embodiments of the present invention will be described in detail below with reference to the accompanying drawings. However, the present invention is not limited to the descriptions of the embodiments and it is easily understood by those skilled in the art that the mode and details can be changed variously. Accordingly, the present invention should not be interpreted as being limited to the descriptions of the embodiments below.

Note that in drawings used in this specification, the sizes, thicknesses, and the like of components such as films, layers, substrates, and regions are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Furthermore, the same hatching pattern is applied to portions having similar functions, and the portions are not especially denoted by reference numerals in some cases.

Note that in this specification and the like, a positive electrode and a negative electrode for a power storage device may be collectively referred to as an electrode; in this case, the electrode refers to at least one of the positive electrode and the negative electrode.

Embodiment 1

In this embodiment, a positive electrode active material of one embodiment of the present invention will be described.

A positive electrode active material of one embodiment of the present invention includes a plurality of particles. A particle diameter of the particle included in the positive electrode active material of one embodiment of the present invention is preferably small, in the positive electrode active material of one embodiment of the present invention, it is preferable that the area of particles in contact with each other be small. The positive electrode active material of one embodiment of the present invention preferably has a particle with a high aspect ratio. The positive electrode active material of one embodiment of the present invention preferably has a flat particle. The positive electrode active material of one embodiment of the present invention is preferably manufactured using a liquid phase method or more preferably, a hydrothermal method.

[Positive Electrode Active Material]

In the positive electrode active material in a particle form, a travel distance of carriers is shortened by reducing the particle diameter, so that the output of the power storage device can be increased. Carriers diffuse in a one-dimensional direction in the positive electrode material having an olivine structure; thus, the output of the power storage device can be increased by reducing the thickness in the b-axis direction which is the moving direction of carriers.

The positive electrode active material having an olivine structure has a small structure change after lithium is released by discharge, is stable in charge and discharge, offers high safety for the power storage device, and has high reliability.

The positive electrode active material of one embodiment of the present invention is, for example, a lithium-containing complex phosphate including one or more of iron, nickel, manganese, and cobalt. Furthermore, the positive electrode active material of one embodiment of the present invention preferably has an olivine structure.

As an example of the lithium-containing complex phosphate having an olivine structure, $LiMPO_4$ (M is one or more of Fe(II), Ni(II), Co(II), and Mn(II)) can be given. Their specific examples include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_aNi_dCo_ePO_4$, $LiFe_aNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<f<1, 0<g<1, 0<h<1, and 0<i<1).

The positive electrode active material in a particle form may form a group of particles. In the group, when the particles are in contact with each other and an electrolyte cannot enter therebetween, carrier ions cannot reach the surface of the particle; thus the reaction surface area of the particle is reduced. The reduction of the reaction surface area may result in a reduction in output of the power storage device.

Therefore, the positive electrode active material preferably has a small particle diameter and a space between the particles large enough for the electrolyte to enter therebetween. For example, in the case where the electrolytic solution is used, the positive electrode active material preferably has a space of more than or equal to 1 nm, preferably more than or equal to 10 nm to allow the electrolytic solution to sufficiently enter therebetween.

The specific surface area of the particle can be measured by having a gas, such as nitrogen absorbed to the surface, for example. For measuring the specific surface area, a BET method, a Langmuir method, and the like can be used, for example. The specific surface area is reduced when the particles are in contact with each other and gas cannot enter therebetween. The larger specific surface area is preferable for the positive electrode active material of one embodiment of the present invention.

In the case where a particle has a small specific surface area, the surface area can be increased in some cases by grinding the particle to be microparticulated. Note that mechanical grinding of particles can cause damage such as deformation or cracks to the particles in some cases; thus it is not preferable. In the case where the particle is mechanically grinded, the shape of the particle becomes close to a spherical shape, for example. In addition, the aspect ratio decreases.

FIG. 1A illustrates an example of a positive electrode active material 201 of one embodiment of the present invention. FIG. 1A shows an observation result of the surface of the positive electrode active material 201 manufactured in Example 1, described later, with use of a scanning electron microscope (SEM). The positive electrode active material 201 shown in FIG. 1A includes a particle including lithium iron phosphate.

The positive electrode active material includes a plurality of particles. Furthermore, the positive electrode active material of one embodiment of the present invention preferably includes a plurality of groups of particles. The positive electrode active material 201 shown in FIG. 1A includes a group 202a, a group 202b, and a group 202c. From FIG. 1A, the size of the group is estimated to be approximately 0.6 µm. Here, the group of particles is referred to as a secondary particle in some cases. In any group, 10 or more particles can be observed. Here, the group has a three dimensional shape; thus, in FIG. 1A, the groups 202a, 202b, and 202c include particles not only in the observed surface portion but also in the depth direction which is not observed. Thus, the group includes 30 or more particles, for example.

The particles included in the positive electrode active material of one embodiment of the present invention forms a group so that the strength of the positive electrode including the positive electrode active material of one embodiment of the present invention can be increased in some cases. On the other hand, in the case where the group of particles is too large, the uniformity of the thickness of the positive electrode is reduced in some cases. Furthermore, the conductive additive and the particles are difficult to be dispersed in some cases.

Thus, the diameter of the group of particles is, for example, preferably less than or equal to 30 µm, further preferably less than or equal to 10 µm, still further preferably more than or equal to 0.1 µm and less than or equal to 6 µm, and yet further preferably more than or equal to 0.3 µm and less than or equal to 3 µm.

Between the particles included in the group, an appropriate space is preferably provided so that an electrolyte can enter. Thus, a surface area of the positive electrode active material is preferably large.

Figure 1B:
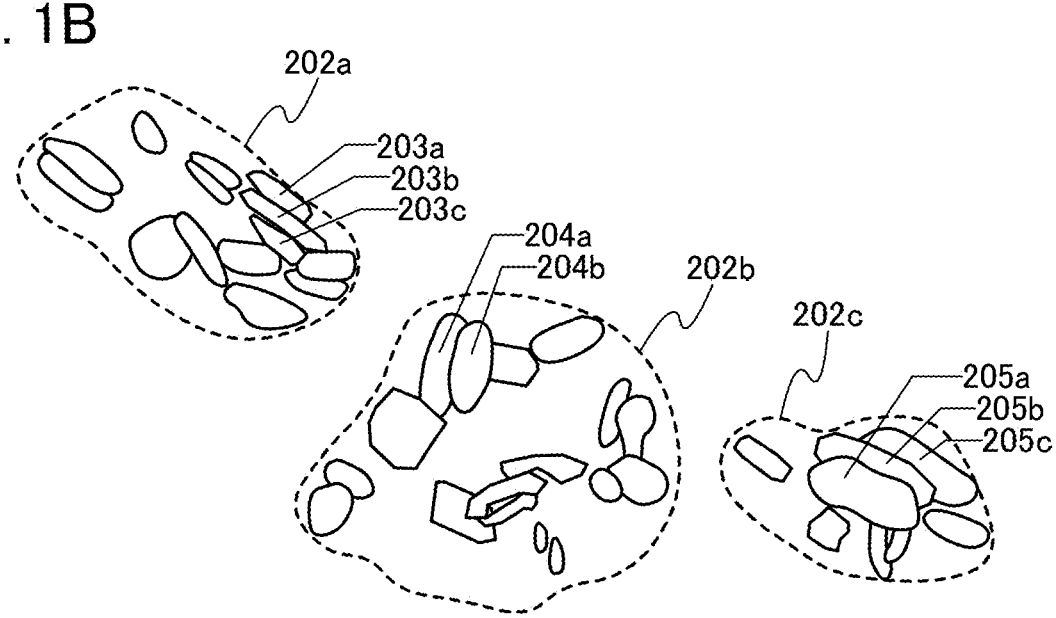

FIG. 1B is a schematic view of the groups. The group 202a includes a plurality of particles such as a particle 203a, a particle 203b, and a particle 203c. The group 202b includes a plurality of particles such as a particle 204a and a particle 204b. The group 202c includes a plurality of particles such as a particle 205a, a particle 205b, and a particle 205c. For simplification of the drawing, only parts of the particles included in the groups of particles are illustrated in FIG. 1B.

The major diameter of the particle included in the positive electrode active material of one embodiment of the present invention is preferably 1.5 to 10 times, 2 to 7 times, or 2 to 6 times the minor diameter.

The ratio of the major diameter to the minor diameter is referred to as an aspect ratio in some cases. A higher aspect ratio leads to easier manufacturing of the positive electrode in some cases. Furthermore, by increasing the aspect ratio, the strength of the positive electrode can be increased in some cases. Furthermore, in the case where the particle has an olivine structure, a minor diameter direction substantially parallel to the b axis leads to a reduction of the diffusion distance of lithium, so that the output of the power storage device can be increased.

Alternatively, the particle included in the positive electrode active material of one embodiment of the present invention has a flat shape. A flat shape refers to, for example, a thin particle. Alternatively, when the particle has a wide surface and a small thickness in a direction substantially perpendicular to the surface, a flat shape refers to the particle with the small thickness. Furthermore, in the case where the particle has an olivine structure, by having the thickness direction substantially parallel to the b axis, the diffusion distance of lithium can be reduced so that the output of the power storage device can be increased.

Here, in the case where the positive electrode active material has an olivine structure, the minor axis preferably goes along the b axis direction. When the minor axis goes along the b axis, the output of the power storage device using the positive electrode active material of one embodiment of the present invention can be increased in some cases.

Here, the major diameter and the minor diameter of the particle may be found by having the particle approximated to an elliptical shape, for example. Alternatively, for example, the particle is approximated to a rectangular solid and the longest side and the shortest side among the three axes are referred to as the major diameter and the minor diameter, respectively, in some cases.

Alternatively, the minor diameter and the major diameter of a primary particle can be estimated by performing surface observation with SEM and ellipse approximation. Alternatively, for example, rectangular approximation is performed in the SEM surface observation and the long side is referred to as the major diameter and the short side is referred to as the minor diameter.

The specific surface area is represented by surface area per weight (the unit is, for example, m$^2$/g). In the case where the shape of the particle is approximated to a sphere shape, the following Formula (1) is satisfied.

[Formula 1]

$$S = 4\pi r^2 \div \left(\frac{4\pi r^3}{3} \times d\right) \tag{1}$$

The diameter 2r can be obtained by substituting a specific surface area S and a density d of the particles into Formula (1). For example, in the case where the particle is lithium iron phosphate and the density d and the specific surface area S are 3.55 g/cm$^3$ and 20 m$^2$/g, respectively, the diameter 2r is 124 nm.

Here, in the case where the value of the diameter of the primary particle observed with SEM is significantly smaller than the particle diameter calculated from the specific surface area, it is suggested that a large number of primary particles are in contact with each other.

Alternatively, as another method for evaluating the particle diameter, measurement with a particle size distribution analyzer with laser diffraction and scattering method can be given as an example. Here, information where information of the particle diameter of the particle and that of the diameter of the group of particles are mixed may be obtained in some cases in the evaluation by a particle size distribution analyzer. For example, information showing the average of the particle diameter of the particle and the diameter of the group of particles can be obtained in some cases. Note that, for example, in the case where a particle diameter which is lower than or equal to the lower measurement limit of the laser diffraction and scattering method exists, information of a range lower than or equal to the lower measurement limit cannot be obtained.

For example, in the case where the particle diameter obtained by measurement with a particle size distribution analyzer using laser diffraction and scattering method has a value significantly larger than the particle diameter obtained from the specific surface area, it is suggested that the particle diameter obtained from the particle size distribution analyzer includes information of the diameter of the group of particles.

The minor diameter of the primary particle is preferably less than or equal to 500 nm, further preferably more than or equal to 10 nm and less than or equal to 200 nm, and still further preferably more than or equal to 20 nm and less than or equal to 130 nm in the positive electrode active material of one embodiment of the present invention.

The specific surface area of the positive electrode active material of one embodiment of the present invention is preferably more than or equal to 12 $m^2/g$, further preferably more than or equal to 15 $m^2/g$ and less than or equal to 40 $m^2/g$, still further preferably more than or equal to 18 $m^2/g$ and less than or equal to 40 $m^2/g$, and yet further preferably more than or equal to 20 $m^2/g$ and less than or equal to 30 $m^2/g$, for example.

In the positive electrode active material of one embodiment of the present invention, the median value of the particle size (particle diameter) calculated by laser diffraction and scattering method is preferably less than or equal to 10 μm, more further preferably more than or equal to 0.5 μm and less than or equal to 6 μm, and still further preferably more than or equal to 0.5 μm and less than or equal to 3 μm.

[Arrangement of Particles]

The particles included in the positive electrode active material of one embodiment of the present invention are arranged so that the major diameters of the two or more particles are substantially parallel to each other when forming the group, for example. Here, FIG. 1B suggests that the major diameters of the particles 203a, 203b, and 203c included in the group 202a are substantially parallel to each other among the particles, for example. Furthermore, it is suggested that the major diameters of the particles 204a and 204b included in the group 202b are substantially parallel to each other among the particles. Furthermore, it is suggested that the particles 205a, 205b, and 205c included in the group 202c are substantially parallel to each other in the major diameter direction.

In this manner, the positive electrode active material of one embodiment of the present invention includes a plurality of particles and the particles are substantially parallel to each other in a major diameter direction, for example, making more than or equal to 0° and less than or equal to 10° in some cases. The electrode density of the positive electrode manufactured using the positive electrode active material of one embodiment of the present invention can be increased in some cases when the plurality of particles are substantially parallel to each other in a major diameter direction. Thus, the energy density of the power storage device can be increased in some cases.

[Manufacturing Method of Positive Electrode Active Material]

The positive electrode active material of one embodiment of the present invention is preferably manufactured using a liquid phase method and more preferably, a hydrothermal method. By using the liquid phase method, particles with a small particle diameter can be obtained. Furthermore, by using the liquid phase method, particles with a high aspect ratio can be obtained in some cases. Furthermore, by using the hydrothermal method, productivity can be increased.

The manufacturing method of the positive electrode active material of one embodiment of the present invention is described with reference to FIG. 2.

In Step S201a, lithium compound is weighed. In Step S201b, a phosphorus compound is weighed.

Here, the atomic ratio of lithium to metal M(II) to phosphorus of the lithium-containing complex phosphate preferably obtained as a synthetic material A, described later, is x:y:z. In order to obtain $LiMPO_4$, for example, x:y:z=1:1:1 is satisfied.

Typical examples of lithium compound include lithium chloride XI), lithium acetate ($CH_3COOLi$), lithium oxalate (($COOLi)_2$), lithium carbonate ($Li_2CO_3$), and lithium hydroxide monohydrate ($LiOH.H_2O$).

Typical examples of the phosphorus compound are a phosphoric acid such as orthophosphoric acid ($H_3O_4$), and ammonium hydrogenphosphates such as diammonium hydrogenphosphate (($NH_4)_2HPO_4$) and ammonium dihydrogenphosphate ($NH_4H_2PO_4$).

Next, in Step S201d, a solvent is weighed. Water is preferably used as the solvent. Furthermore, a mixed solution containing water and another solvent may be used as the solvent. For example, water and alcohol may be mixed. Here, the solubility of lithium compound, phosphorus compound, and a reaction product of lithium compound and phosphorus compound in water and the solubility thereof in alcohol are different in some cases. By using alcohol, the grain size of the particle, which is to be formed, becomes smaller in some cases. Furthermore, by using alcohol with a lower boiling point than water, pressure can be easily increased in some cases in Step S211 described later.

Next, a mixed solution A is formed in Step S205. Mixing can be performed under an atmosphere of air, inert gas, or the like. As the inert gas, nitrogen may be used, for example. Here, as an example, in an air atmosphere, the solvent weighed in Step S201d, lithium compound weighed in Step S201a, and the phosphorus compound weighed in Step S201b are mixed. For example, lithium compound weighed in Step S201a and the phosphorus compound weighed in Step S201b are put in the solvent weighed in Step S201d, so that the mixed solution A is formed. In the case of forming the mixed solution A in the air atmosphere, an apparatus for controlling the atmosphere is not necessary, so that the process can be simplified and cost can be reduced as compared with the case where inert gas is used.

In the mixed solution A, lithium compound, the phosphorus compound, and the reaction product of lithium compound and the phosphorus compound precipitate, but are partly dissolved without precipitating, i.e., partly exist in the solvent as ions. Here, when the mixed solution A has a low pH, there are cases where the reaction product and the like are easily dissolved in the solvent. When the mixed solution A has a high pH, there are cases where the reaction product and the like are easily precipitated in the solvent.

Note that instead of forming the mixed solution A through Step S205, a compound including phosphorus and lithium such as $Li_3PO_4$, $Li_2HPO_4$, or $LiH_2PO_4$ is weighed and added to the solvent so that the mixed solution A may be formed.

Here, in the case where the mixed solution A is an aqueous solution, pH of the mixed solution A is determined by the type and dissociation degree of salt included in the mixed solution A. Thus, with lithium compound and the phosphorus compound used as source materials, pH of the mixed solution A changes. For example, in the case of using lithium chloride as lithium compound and the orthophosphoric acid as the phosphorus compound, the mixed solution A is a strong acid. Furthermore, for example, in the case where the lithium hydroxide monohydrate is used as lithium compound, the mixed solution A is likely to be alkaline.

Next, the mixed solution A and a solution Q weighed in Step S205b are mixed, so that a mixed solution B is formed in Step S207. Here, by adjusting the amount or concentration of the solution Q which is added, pH of the obtained mixed solution B and that of a later obtained mixed solution C can be adjusted. In Step S207, while pH of the mixed solution A is measured, the solution Q may be dropped, for example. As the solution Q, the alkaline solution or the acid solution is used in accordance with pH of the mixed solution A. By using a slightly alkaline solution, or a slightly acidic solution, pH is easily adjusted in some cases. For example, a pH of the alkaline solution may be greater than or equal to 8 and less than or equal to 12. Furthermore, a pH of the acid solution may be greater than or equal to 2 and less than or equal to 6. As the alkaline solution, ammonia water may be used, for example. It is preferable to determine pH of the solution Q so that the mixed solution C, which is described later, is acidic or neutral.

In Step S208, one or more of an iron(II) compound, a manganese(II) compound, a cobalt(II) compound, and a nickel(II) compound (hereinafter referred to as an M(II) compound) are weighed.

Typical examples of the iron(III) compound are iron chloride tetrahydrate ($FeCl_2.4H_2O$), iron sulfate heptahydrate ($FeSO_4.7H_2O$), and iron acetate ($Fe(CH_3COO)_2$).

Typical examples of the manganese(II) compound are manganese chloride tetrahydrate ($MnCl_2.4H_2O$), manganese sulfate-hydrate ($MnSO_4.H_2O$), and manganese acetate tetrahydrate ($Mn(CH_3COO)_2.4H_2O$).

Typical examples of the cobalt(II) compound are cobalt chloride hexahydrate ($CoCl_2.6H_2O$), cobalt sulfate heptahydrate ($CoSO_4.7H_2O$), and cobalt acetate tetrahydrate ($Co(CH_3COO)_2.4H_2O$).

Typical examples of the nickel(II) compound are nickel chloride hexahydrate ($NiCl_2.6H_2O$), nickel sulfate hexahydrate ($NiSO_4.6H_2O$), and nickel acetate tetrahydrate ($Ni(CH_3COO)_2.4H_2O$).

Next, the mixed solution C is formed in Step S209. Step S209 can be performed under an atmosphere of air, inert gas, or the like. As the inert gas, nitrogen may be used, for example. Here, as an example, in an air atmosphere, the mixed solution A formed in Step S207 and the M(II) compound weighed in Step S208 are mixed so that the mixed solution C is formed. In the case of performing Step S209 in the air atmosphere, it is preferable that Step S208 is performed right before Step S209, for example, within 1 hour, further preferably within 20 minutes, and still further preferably within 10 minutes.

Here, in Step S209, the concentration of the mixed solution C is adjusted by adding a solvent. After a mixture of the mixed solution B and the M(II) compound is formed, the solvent is weighed in Step S209b and the solvent and the mixture are mixed in Step S209 so that the mixed solution C is manufactured.

Next, in Step S211, the mixed solution C is put into a heat and pressure resistant container such as an autoclave. Heating is performed at a temperature higher than or equal to 100° C. and lower than or equal to 350° C., preferably higher than 100° C. and lower than 200° C. and wider a pressure higher than or equal to 0.11 MPa and lower than or equal to 100 MPa, preferably higher than or equal to 0.11 MPa and lower than or equal to 2 MPa for more than or equal to 0.5 hours and less than or equal to 24 hours, preferably more than or equal to 1 hour and less than or equal to 10 hours, and further preferably more than or equal to 1 hour and less than 5 hours and the solution is then cooled. The solution in the heat and pressure resistant container is then filtered, followed by washing and drying. After that, the solution is separated. For example, filtration and washing are performed. Then, drying is performed in Step S213, and the synthetic material A is obtained.

Here, the lithium-containing complex phosphate, more specifically, $LiMPO_4$ (M is one or more of Fe(II), Ni(II), Co(II), and Mn(II)), for example, can be preferably obtained as the synthetic material A. As the lithium-containing complex phosphate, $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq1$, $0<a<1$, $0<b<1$), $LiFe_cNi_dCo_ePO_4$, $LiFe_cNi_dMn_ePO_4$, $LiNi_cCo_dMn_ePO_4$ ($c+d+e\leq1$, $0<c<1$, $0<d<1$, $0<e<1$), $LiFe_fNi_gCo_hMn_iPO_4$ ($f+g+h+i\leq1$, $0<f<1$, $0<g<1$, $0<h<1$, $0<i<1$), or the like can be obtained as appropriate depending on the type of the M(II) compound. The lithium-containing complex phosphate obtained in this embodiment might be a single-crystal grain.

By performing crystal analysis such as XRD or electron diffraction on the synthetic material A, the crystal structure can be identified. By performing crystal analysis on the synthetic material A, a crystal structure belonging to a space group Pnma can be obtained in some cases. Here, $LiMPO_4$ having an olivine crystal structure belongs to the space group Pnma, for example.

Here, pH of the mixed solution C is preferably set to more than or equal to 3 and less than or equal to 5 and the highest temperature in Step S211 is set to more than 150° C. and less than 300° C., more preferably more than or equal to 160° C. and less than 200° C., whereby the synthetic material A with excellent characteristics with a large specific surface area and a high aspect ratio can be obtained in some cases. By increasing the reaction temperature, the frequency of the dissolution is increased in contrast with a deposition rate and the adhesion of the particles can be prevented in some cases. For example, by preferably setting pH to more than or equal to 3 and less than or equal to 5 and by preferably setting the highest temperature to more than 150° C., the adhesion of the particles can be prevented, the particles form a group, and the particles are arranged so that the major diameters of the particles are substantially parallel to each other in two or more particles when the particles form a group.

Embodiment 2

In this embodiment, a storage battery of one embodiment of the present invention will be described.

A storage battery of one embodiment of the present invention includes a positive electrode, a negative electrode, and an electrolytic solution.

The positive electrode active material preferably includes the positive electrode active material described in Embodiment 1, for example.

[Negative Electrode Active Material]

In the case where the active material is a negative electrode active material, for example, an alloy-based material, a carbon-based material, or the like can be used.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. SiO can alternatively be expressed as SiOx. Here, x preferably has an approximate value of 1. For example, x is preferably 0.2 or more and 1.5 or less, and more preferably 0.3 or more and 1.2 or less.

As the carbon-based material, graphite, graphitizing carbon (soft carbon), non-graphitizing carbon (hard carbon), a carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are intercalated into the graphite (while a lithium-graphite intercalation compound is generated). For this reason, a lithium-ion secondary battery can have a high operating voltage. In addition, graphite is preferred because of its advantages such as a relatively high capacity per unit volume, relatively small volume expansion, low cost, and higher level of safety than that of the lithium metal.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/$cm^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. Note that in the case of using a material including lithium ions as a positive electrode active material, the nitride including lithium and a transition metal can be used for the negative electrode active material by extracting the lithium ions included in the positive electrode active material in advance.

Alternatively, a material which causes a conversion reaction can be used for the negative electrode active materials; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

[Predoping]

In the case where a coating film is formed in the initial charge and discharge cycle, an irreversible reaction occurs. For example, in the case where one of an irreversible reaction at the positive electrode and an irreversible reaction at the negative electrode is greater than the other, the balance between charge and discharge might be disrupted, resulting in a decrease in the capacity of the storage battery. Replacing an electrode used as a counter electrode after charge and discharge using the counter electrode are performed can inhibit a decrease in capacity. For example, charge or charge and discharge are performed using a positive electrode in combination with a negative electrode, and then, the positive electrode is removed to be replaced with another positive electrode in the storage battery. This may inhibit a decrease in the capacity of the storage battery. This method may be called predoping or preaging.

A current collector included in each of the positive electrode and the negative electrode can be formed using a material that has high conductivity, such as a metal of stainless steel, gold, platinum, aluminum, titanium, or an alloy thereof. In the case where the current collector is used in the positive electrode, it is preferred that it not dissolve at the potential of the positive electrode. In the case where the current collector is used in the negative electrode, it is preferred that it not be alloyed with carrier ions such as lithium. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collector can have any of various shapes including a foil-like shape, a plate-like shape (sheet-like shape), a net-like shape, a punching-metal shape, and an expanded-metal shape. The current collector preferably has a thickness of more than or equal to 5 μm and less than or equal to 30 μm.

The positive electrode and the negative electrode may include a conductive additive. Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, and further preferably greater than or equal to 1 wt % and less than or equal to 5 wt %.

A network for electrical conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound may have excellent electrical characteristics of high conductivity and excellent physical properties of high flexibility and high mechanical strength. A graphene compound has a planar shape and enables low-resistance surface contact. Furthermore, a graphene compound has extremely high conductivity even with a small thickness in some cases and thus allows a conductive path to be formed in an active material layer efficiently even with a small amount. For this reason, it is preferable to use a graphene compound as the conductive additive because the area where the active material and the conductive additive are in contact with each other can be increased. In addition, it is preferable to use a graphene compound as the conductive additive because the electrical resistance can be reduced in some cases. Here, it is particularly preferred that graphene, multilayer graphene, or reduced graphene oxide (hereinafter referred to as RGO), for example, be used as a graphene compound. Note that RGO refers to a compound obtained by reducing graphene oxide (GO), for example.

In the case where an active material with a small particle diameter (e.g., 1 μm or less) is used, the specific surface area of the active material is large and thus more conductive paths for the active material particles are needed. In such a case, a graphene compound that can efficiently form a conductive path even in a small amount is particularly preferably used.

A cross-sectional structure example of the active material layer 102 containing a graphene compound as a conductive additive will be described below.

Figure 3A:
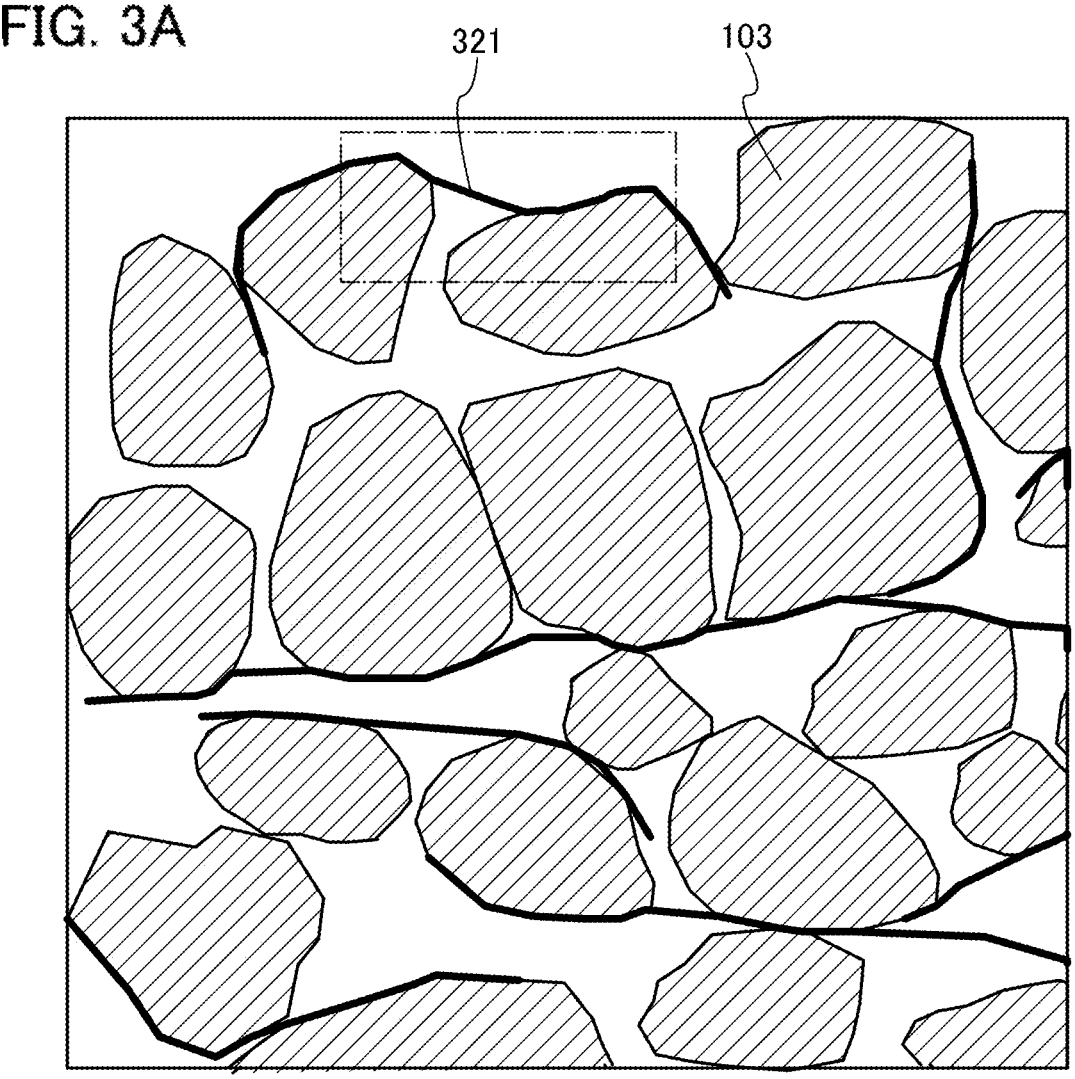
FIGS. 3A and 3B are diagrams illustrating part of a cross section of an electrode.
Figure 3B:
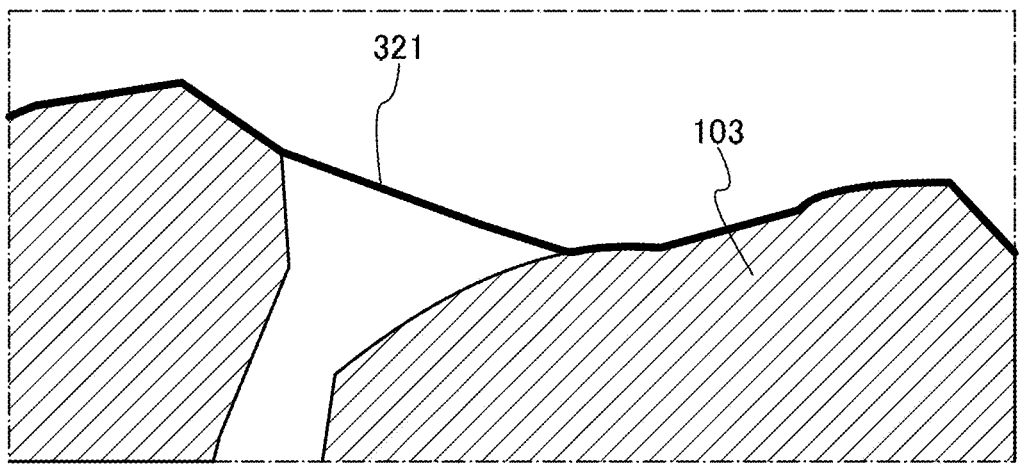

FIG. 3A is a longitudinal sectional view of the active material layer 102. The active material layer 102 includes active material particles 103, graphene compounds 321 as a conductive additive, and a binder (not illustrated). Here, graphene or multilayer graphene can be used as the graphene compound 321, for example. The graphene compound 321 preferably has a sheet-like shape. The graphene compound 321 may have a sheet-like shape formed of a plurality of sheets of multilayer graphene and/or a plurality of sheets of graphene that partly overlap with each other.

The longitudinal section of the active material layer 102 in FIG. 3A shows dispersion of the sheet-like graphene compounds 321 in the active material layer 102. The graphene compounds 321 are schematically shown by thick lines in FIG. 3A but are actually thin films each having a thickness corresponding to the thickness of a single layer or a multi-layer of carbon molecules. The plurality of graphene compounds 321 are formed in such a way as to wrap, coat, or adhere to the surfaces of the plurality of active material particles 103, so that the graphene compounds 321 make surface contact with the active material particles 103.

Here, a plurality of graphene compounds are bonded to each other to form a net-like graphene compound sheet (hereinafter referred to as a graphene compound net or a graphene net). The graphene net covering the active material can function as a binder for bonding active materials. The amount of the binder can thus be reduced, or the binder does not have to be used. This can increase the proportion of the active material in the electrode volume or weight. That is to say, the capacity of the power storage device can be increased.

Here, it is preferable to perform reduction after a layer to be the active material layer 102 is formed in such a manner that graphene oxide is used as the graphene compound 321 and mixed with an active material. When graphene oxide with extremely high dispersibility in a polar solvent is used for the formation of the graphene compounds 321, the graphene compounds 321 can be preferably dispersed in the active material layer 102. The solvent is removed by volatilization from a dispersion medium in which graphene oxide is uniformly dispersed, and the graphene oxide is reduced; hence, the graphene compounds 321 remaining in the active material layer 102 partly overlap with each other and are dispersed such that surface contact is made, thereby forming a three-dimensional conduction path. Note that graphene oxide can be reduced either by heat treatment or with the use of a reducing agent, for example.

Unlike a conductive additive in the form of particles, such as acetylene black, which makes point contact with an active material, the graphene compound 321 is capable of making low-resistance surface contact; accordingly, the electrical conduction between the active material particles 103 and the graphene compounds 321 can be improved with a smaller amount of the graphene compounds 321 than that of a normal conductive additive. Thus, the proportion of the active material particles 103 in the active material layer 102 can be increased. Accordingly, the discharge capacity of a power storage device can be increased.

The positive electrode and the negative electrode may each include a binder. As the binder, for example, a rubber material such as styrene-butadiene rubber (SBR), styrene-isoprene-styrene rubber, acrylonitrile-butadiene rubber, butadiene rubber, or ethylene-propylene-diene copolymer can be used. Alternatively, fluororubber can be used as the binder.

For the binder, for example, water-soluble polymers are preferably used. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVH), polyacrylonitrile (PAN), ethylene-propylene-diene polymer, polyvinyl acetate, or nitrocellulose is preferably used.

Two or more of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder such as styrene-butadiene rubber in an aqueous solution. Furthermore, a water-soluble polymer is easily and stably adsorbed to an active material surface because it has a functional group, it is preferable to use a cellulose derivative because many cellulose derivatives such as carboxymethyl cellulose have functional groups such as a hydroxyl group and a carboxyl group. Because of functional groups, polymers interact with each other and cover an active material surface in a large area.

The case where the binder covering or being in contact with the active material surface forms a film is preferred because the film may as a passivation film to suppress the decomposition of the electrolytic solution. Here, the passivation film refers to a film without electric conductivity or a film with extremely low electric conductivity, and can inhibit the decomposition of an electrolytic solution at a potential at which a battery reaction occurs in the case where the passivation film is formed on the active material surface, for example. It is preferred that the passivation film can conduct lithium ions while suppressing electric conduction.

[Method for Manufacturing Electrode]

In examples of methods for manufacturing negative and positive electrodes, a slurry is formed and an electrode is manufactured by application of the slurry. A method for forming a slurry used for manufacturing an electrode will be described.

A polar solvent is preferably used as the solvent used for formation of the slurry. Examples of the polar solvent include water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

First, the active material, the conductive additive, and the binder are mixed to form Mixture J. Next, the solvent is added to Mixture J and kneading (mixing with a high viscosity) is performed, so that Mixture K is formed. Here, Mixture K is preferably in a paste form, for example. In the case where a second binder is added later, a first binder is not necessarily added in this step in some cases.

Next, the solvent is added to Mixture K and kneading is performed, so that Mixture L is formed.

Next, in the case where the second binder is used, the second binder is added to form Mixture M. At this time, a solvent may be added. In the case where the second binder is not used, a solvent is added as needed to form Mixture N.

Then, Mixture M or Mixture N formed in a reduced-pressure atmosphere is kneaded, for example, to form Mixture O. At this time, a solvent may be added. In the mixing and kneading steps in each step, a mixer may be used, for example.

Then the viscosity of Mixture O is measured. After that, a solvent is added as needed to adjust the viscosity. Through the above steps, slurry for application of the active material layer is obtained.

Here, for example, the higher the viscosity of Mixtures L to O is, the higher the dispersibility of the active material, the binder, and the conductive additive in the mixtures is (the better they are mixed together), in some cases. Thus, the viscosity O is preferably higher. However, an excessively high viscosity of Mixture O is not preferred in terms of productivity because it might reduce the electrode application speed.

Next, a method for manufacturing the active material layer over the current collector with the use of the formed slurry will be described.

First, the slurry is applied to the current collector. Before the application of the slurry, surface treatment may be performed on the current collector. Examples of surface treatment include corona discharge treatment, plasma treatment, and undercoat treatment. Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black (registered trademark), and a carbon nanotube.

For the application of the slurry, a slot die method, a gravure method, a blade method, or combination of any of them can be used. Furthermore, a continuous coater or the like may be used for the application.

Then, the solvent of the slurry is volatilized to form the active material layer.

The step of volatilizing the solvent of the slurry is preferably performed at a temperature in the range from 50° C. to 200° C. inclusive, more preferably from 60° C. to 150° C. inclusive.

Heat treatment is performed using a hot plate at 30° C. or higher and 70° C. or lower in an air atmosphere for longer than or equal to 10 minutes, and then, for example, another heat treatment is performed at room temperature or higher and 100° C. or lower in a reduced-pressure environment for longer than or equal to 1 hour and shorter than or equal to 10 hours.

Alternatively, heat treatment may be performed using a drying furnace or the like. In the case of using a drying furnace, the heat treatment is performed at 30° C. or higher and 120° C. or lower for longer than or equal to 30 seconds and shorter than or equal to 20 minutes, for example.

The temperature may be increased in stages. For example, after heat treatment is performed at 60° C. or lower for shorter than or equal to 10 minutes, another heat treatment may further be performed at higher than or equal to 65° C. for longer than or equal to 1 minute.

The thickness of the active material layer formed through the above steps is, for example, preferably greater than or equal to 5 μm and less than or equal to 300 μm, more preferably greater than or equal to 10 μm and less than or equal to 150 μm. Furthermore, the amount of the active material in the active material layer 102 is, for example, preferably greater than or equal to 2 mg/cm$^2$ and less than or equal to 50 mg/cm$^2$.

The active material layer may be formed over only one surface of the current collector, or the active material layers may be formed such that the current collector is sandwiched therebetween. Alternatively, the active material layers may be formed such that part of the current collector is sandwiched therebetween.

After the volatilization of the solvent from the active material layer, pressing may be performed by a compression method such as a roll press method or a flat plate press method. In performing pressing, heat may be applied.

Note that the active material layer may be predoped. There is no particular limitation on the method for predoping the active material layer. For example, the active material layer may be predoped electrochemically. For example, before a battery is assembled, the active material layer can be predoped with lithium in an electrolytic solution described later with the use of a lithium metal as a counter electrode. Alternatively, predoping may be performed using a positive electrode for predoping as a counter electrode of a negative electrode, and then, the positive electrode for predoping may be removed. Predoping can particularly inhibit a decrease in initial charge and discharge efficiency, leading to an increase in the capacity of the storage battery.

This embodiment can be implemented in combination with any of the other embodiments as appropriate.

Embodiment 3

In this embodiment, power storage devices of embodiments of the present invention will be described.

Examples of the power storage device of one embodiment of the present invention include a secondary battery that utilizes an electrochemical reaction, such as a lithium ion battery, an electrochemical capacitor such as an electric double-layer capacitor or a redox capacitor, an air battery, and a fuel battery.

[Thin Storage Battery]

Figure 4:
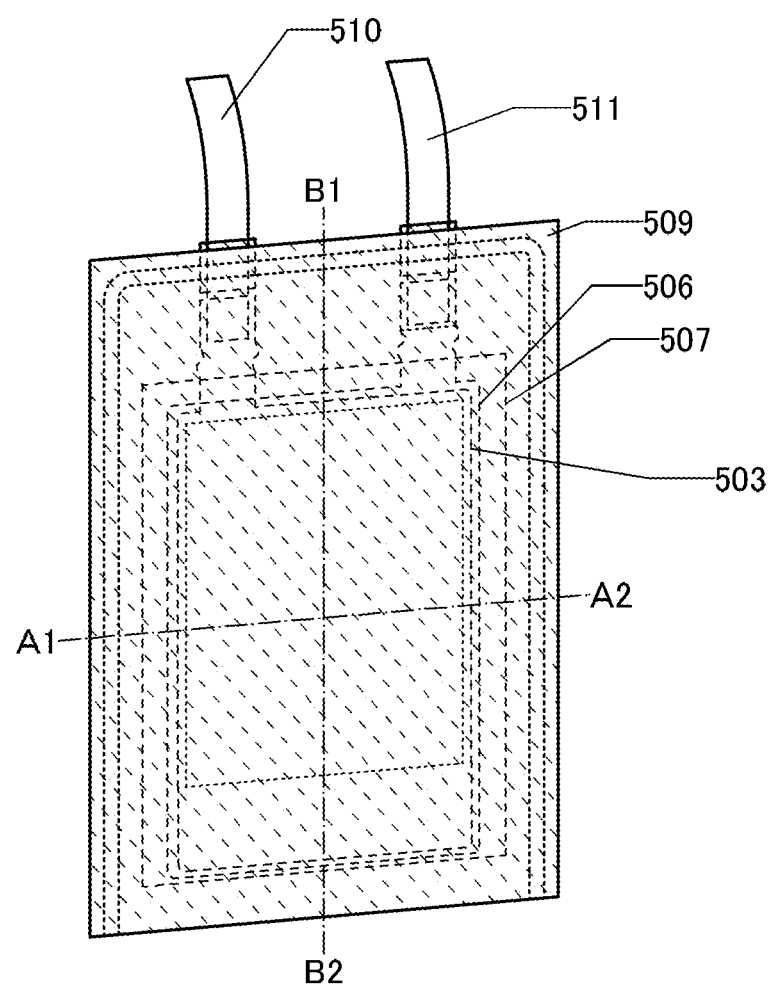
FIG. 4 illustrates a storage battery.

FIG. 4 illustrates a thin storage battery as an example of a storage device. FIG. 4 illustrates an example of a thin storage battery. When a flexible thin storage battery is used in an electronic device at least part of which is flexible, the storage battery can be bent as the electronic device is bent.

Figure 5A:
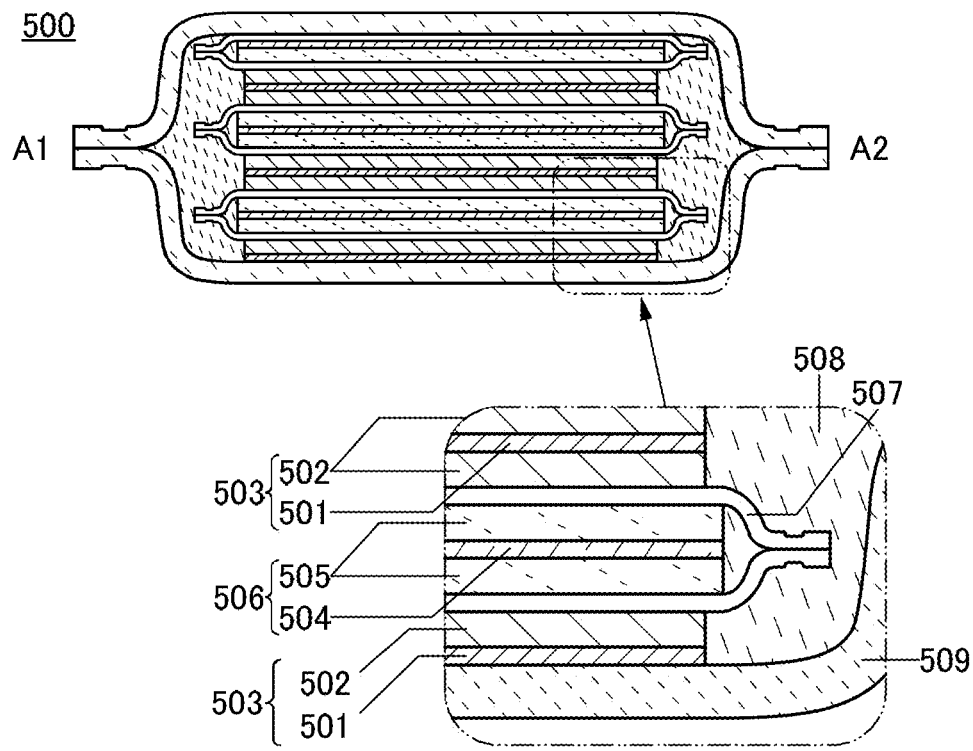
FIGS. 5A and 5B are each a cross-sectional view of a storage battery.
Figure 5B:
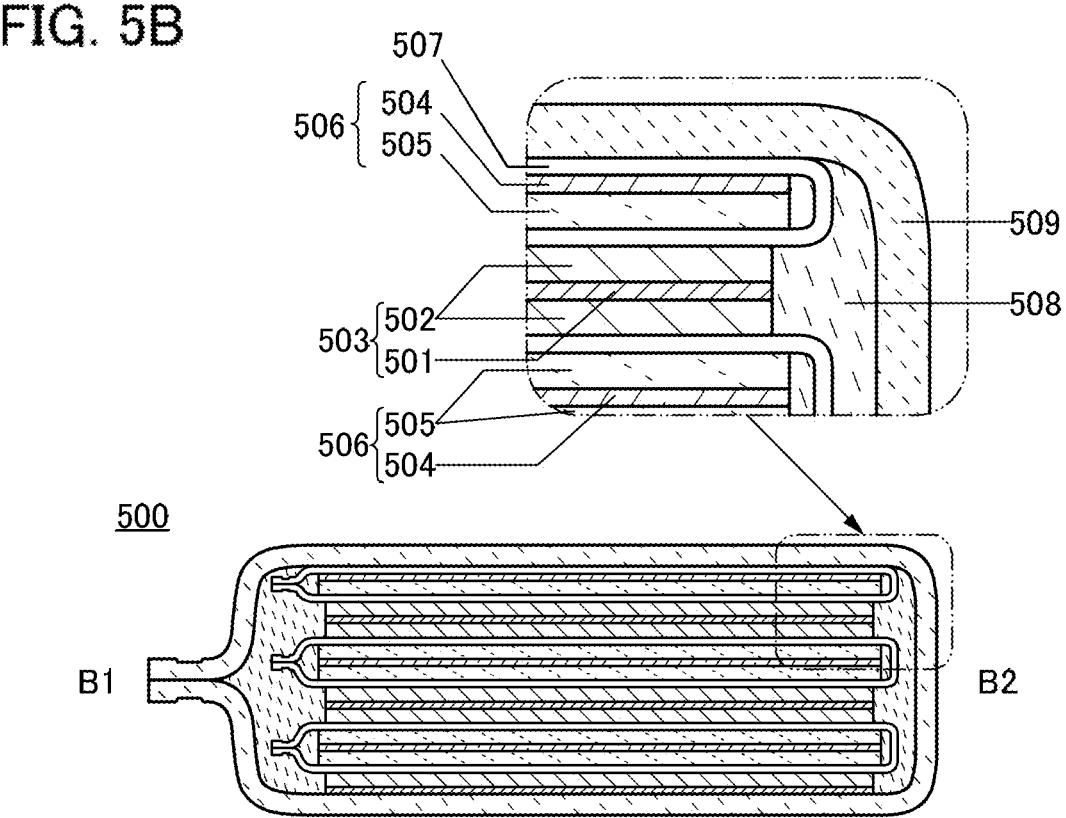

FIG. 4 is an external view of a storage battery 500, which is a thin storage battery. FIG. 5A is a cross-sectional view taken along dashed-dotted line A1-A2 in FIG. 4, and FIG. 5B is a cross-sectional view taken along dashed-dotted line B1-B2 in FIG. 4. The storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is contained in the exterior body 509.

As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent of the electrolytic solution, safety against liquid leakage and the like is improved. Furthermore, a secondary battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like.

Alternatively, the use of one or more types of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, s $LiC(CF_3SO_2)_3$, $LiC(C_2F_5SO_2)_3$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1% and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a polymer gelled electrolyte obtained in such a manner that a polymer is swelled with an electrolytic solution may be used.

Examples of polymers include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

Figure 6A:
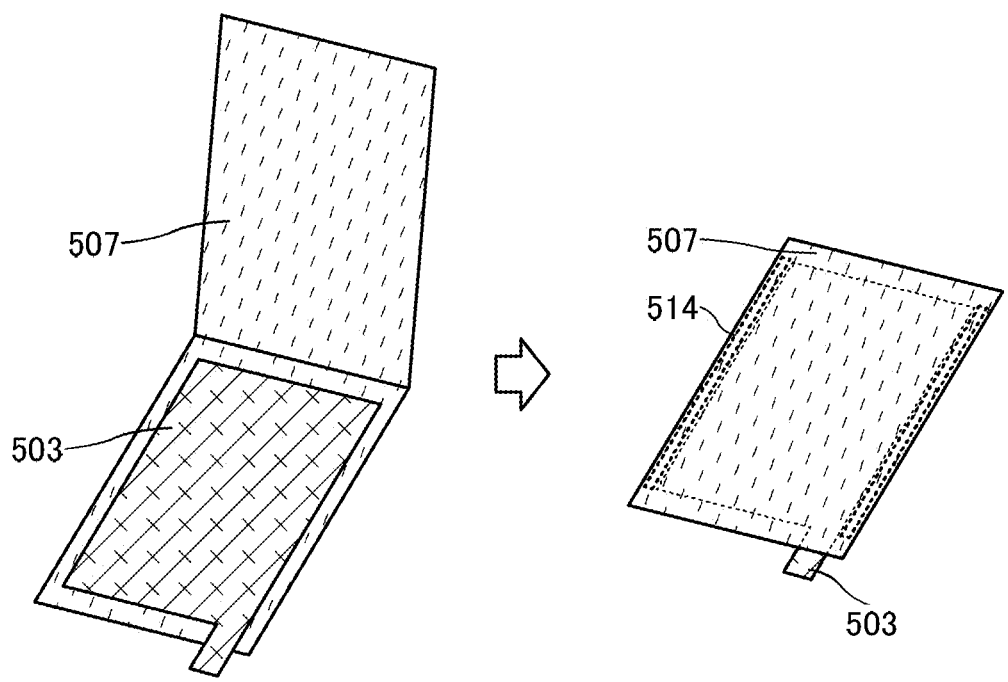
FIGS. 6A and 6B illustrate a method of manufacturing a storage battery.
Figure 6B:
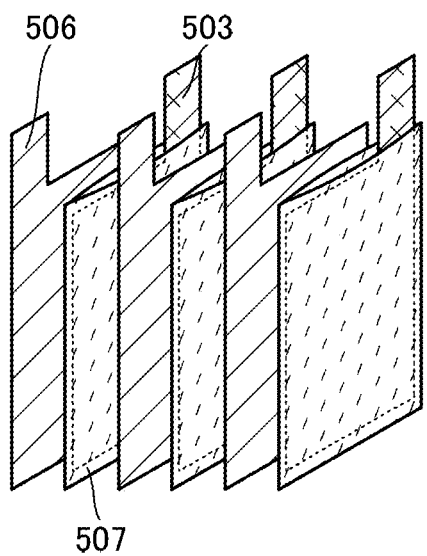

The separator 507 is preferably formed to have a bag-like shape to surround one of the positive electrode 503 and the negative electrode 506. For example, as illustrated in FIG. 6A, the separator 507 is folded in two so that the positive electrode 503 is sandwiched, and sealed with a sealing portion 514 in a region outside the region overlapping with the positive electrode 503; thus, the positive electrode 503 can be reliably supported inside the separator 507. Then, as illustrated in FIG. 6B, the positive electrodes 503 surrounded by the separators 507 and the negative electrodes 506 are alternately stacked and provided in the exterior body 509, whereby the storage battery 500 can be formed.

Next, aging after manufacturing a storage battery will be described. Aging is preferably performed after manufacturing of a storage battery. The aging can be performed under the following conditions, for example. Charge is performed at a rate of 0.001 C or more and 0.2 C or less. The temperature may be higher than or equal to room temperature and lower than or equal to 50° C. In the case where the reaction potential of the positive electrode or the negative electrode is out of the range of the potential window of the electrolytic solution 508, the electrolytic solution is decomposed by charge and discharge operations of a storage battery in some cases. In the case where the electrolytic solution is decomposed and a gas is generated and accumulated in the cell, the electrolytic solution is not in contact with a surface of the electrode in some regions. That is to say, an effectual reaction area of the electrode is reduced and effectual resistance is increased.

When the resistance is extremely increased, the negative electrode potential is lowered. Consequently, lithium is intercalated into graphite and lithium is deposited on the surface of graphite. Lithium deposition might reduce capacity. For example, if a film or the like is grown on the surface after lithium deposition, lithium deposited on the surface cannot be dissolved again. This lithium cannot contribute to capacity. in addition, when deposited lithium is physically collapsed and conduction with the electrode is lost, this lithium also cannot contribute to capacity. Therefore, the gas is preferably released before the negative electrode potential reaches the potential of lithium because of an increase in a charging voltage.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolytic solution decomposed on the surface forms a film on a surface of graphite. The formed coating film may thus be densified when the charging state is held at a temperature higher than room temperature after the release of the gas, for example.

Figure 7A:
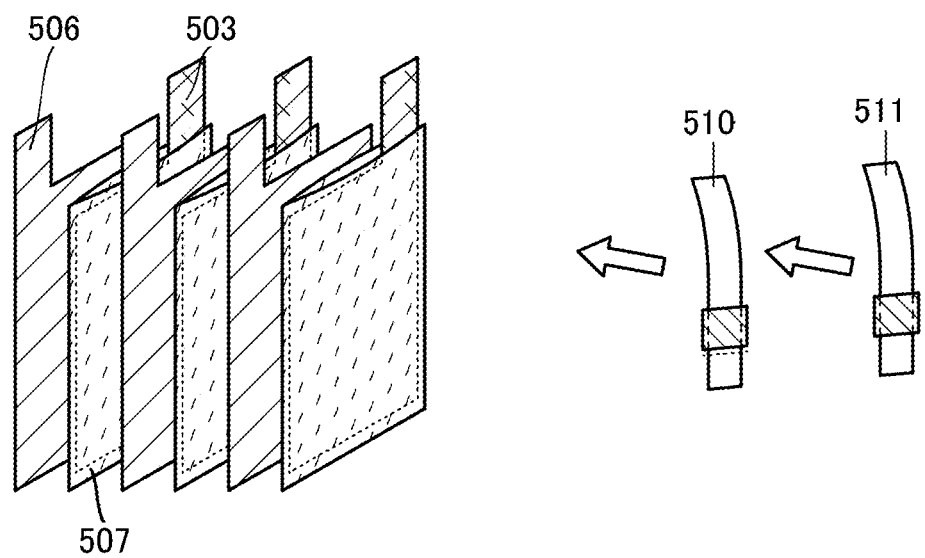
FIGS. 7A and 7B illustrate a method of manufacturing a storage battery.
Figure 7B:
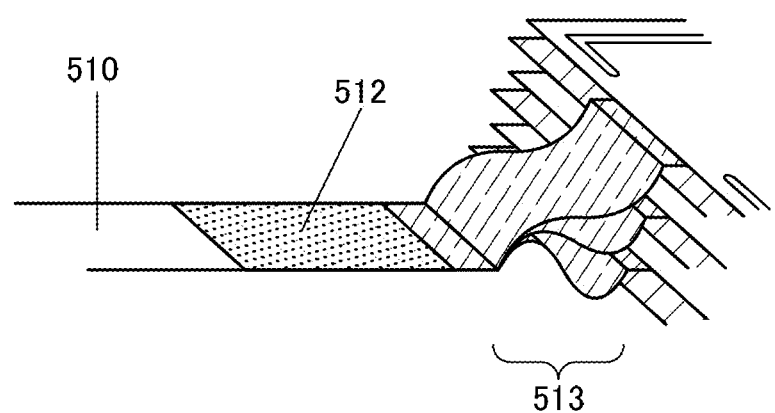

FIGS. 7A and 7B illustrate an example where current collectors are welded to a lead electrode. As illustrated in FIG. 7A, the positive electrodes 503 each wrapped by the separator 507 and the negative electrodes 506 are alternately stacked. Then, the positive electrode current collectors 501 are welded to a positive electrode lead electrode 510, and the negative electrode current collectors 504 are welded to a negative electrode lead electrode 511. FIG. 7B illustrates an example in which the positive electrode current collectors 501 are welded to the positive electrode lead electrode 510. The positive electrode current collector 501 is welded to the positive electrode lead electrode 510 in a welding region 512 by ultrasonic welding or the like. The positive electrode current collector 501 includes a bent portion 513 as illustrated in FIG. 7B, and it is therefore possible to relieve stress due to external force applied after manufacturing the storage battery 500. The reliability of the storage battery 500 can be thus increased.

In the storage battery 500 illustrated in FIG. 4 and FIGS. 5A and 5B, the positive electrode current collectors 501 in the positive electrode 503 and the negative electrode current collectors 504 in the negative electrode 506 are welded to the positive electrode lead electrode 510 and a negative electrode lead electrode 511, respectively, by ultrasonic welding. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside of the exterior body 509 without using lead electrodes.

Figure 8:
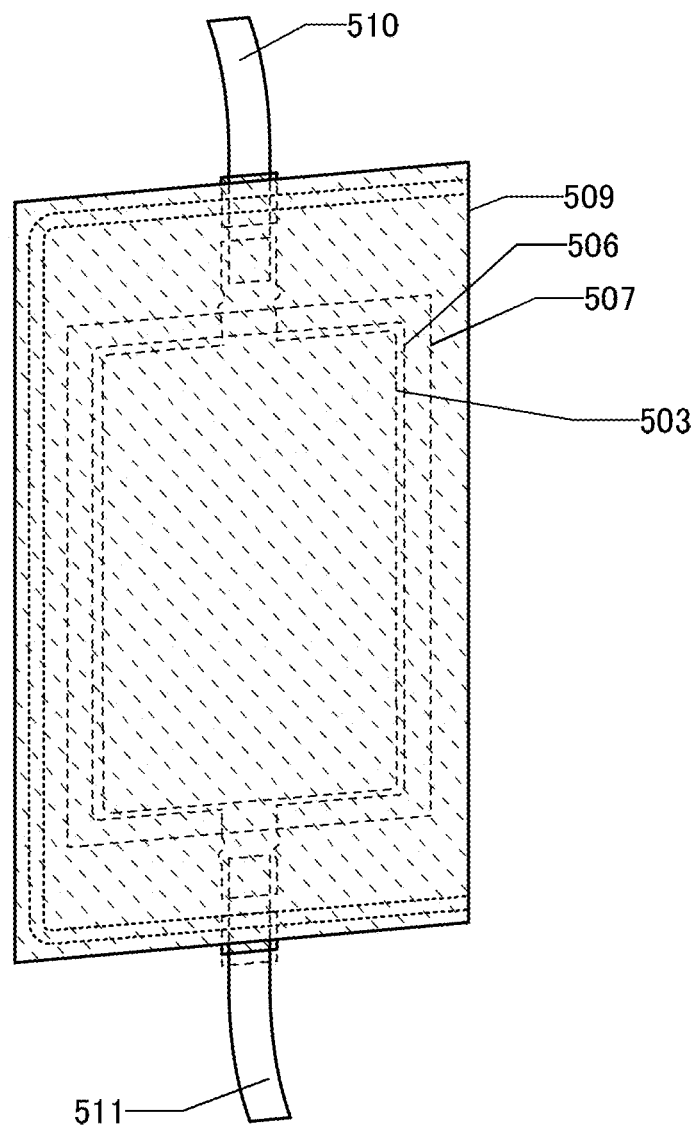
FIG. 8 illustrates a storage battery.

Although the positive electrode lead electrode 510 and the negative electrode lead electrode 511 are provided on the same side in FIG. 4, the positive electrode lead electrode 510 and the negative electrode lead electrode 511 may be provided on different sides as illustrated in FIG. 8. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

As the exterior body 509 in the storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Although the examples in FIGS. 5A and 5B each include five positive electrode active material layer-negative electrode active material layer pairs (the positive and negative electrode active material layers of each pair face each other), it is needless to say that the number of pairs of active material layers is not limited to five, and may be more than five or less than five. In the case of using a large number of active material layers, the storage battery can have a high capacity. In contrast, in the case of using a small number of active material layers, the storage battery can have a small thickness and high flexibility.

In the above structure, the exterior body 509 of the secondary battery can change its form such that the smallest curvature radius is greater than or equal to 3 mm and less than or equal to 30 mm, preferably greater than or equal to 3 mm and less than or equal to 10 mm. One or two films are used as the exterior body of the secondary battery. In the case of a secondary battery having a layered structure, a cross-sectional structure of the battery that is bent is surrounded by two curves of the film serving as the exterior body.

Figure 9A:
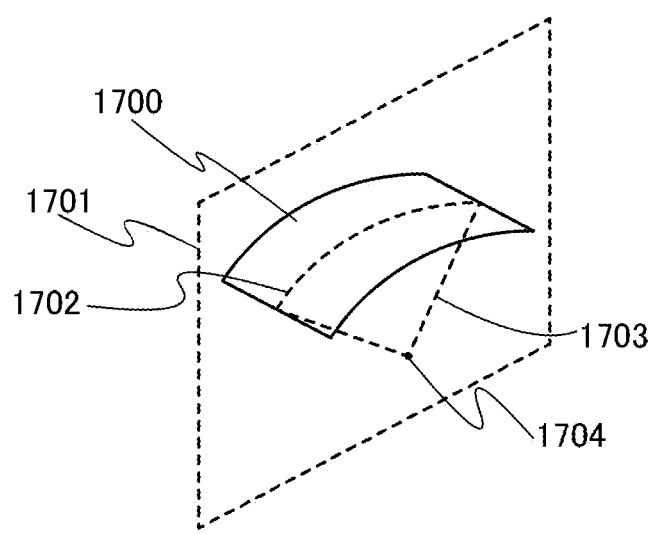
FIGS. 9A to 9C are each a diagram for illustrating a radius of curvature of a surface.
Figure 9B:
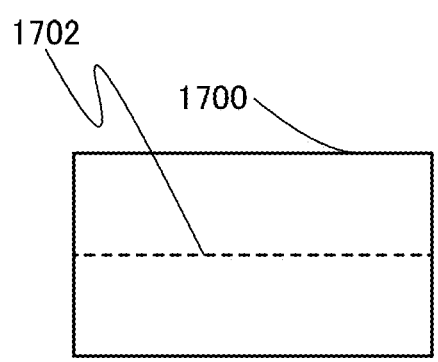
Figure 9C:
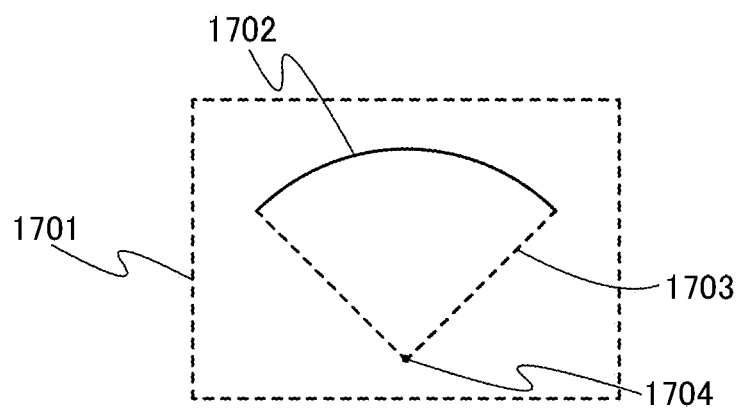

Description will be given of the radius of curvature of a surface with reference to FIGS. 9A to 9C. In FIG. 9A, on a plane 1701 along which a curved surface 1700 is cut, part of a curve 1702 of the curved surface 1700 is approximated to an arc of a circle, and the radius of the circle is referred to as a radius 1703 of curvature and the center of the circle is referred to as a center 1704 of curvature. FIG. 9B is a top view of the curved surface 1700. FIG. 9C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

In the case of bending a secondary battery in which a component 1805 including electrodes, an electrolytic solution, and the like is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 10A). When the secondary battery is curved and has an arc-shaped cross section, compressive stress is applied to a surface of the film on the side closer to the center 1800 of curvature and tensile stress is applied to a surface of the film on the side far from the center 1800 of curvature (FIG. 10B). However, by forming a pattern including projections or depressions on surfaces of the exterior bodies, the influence of a strain can be reduced to be acceptable even when compressive stress and tensile stress are applied. For this reason, the secondary battery can change its form such that the exterior body on the side closer to the center of curvature has the smallest curvature radius greater than or equal to 3 mm and less than or equal to 30 mm, preferably greater than or equal to 3 mm and less than or equal to 10 mm.

Note that the cross-sectional shape of the secondary battery is not limited to a simple arc shape, and the cross section can be partially arc-shaped; for example, a shape illustrated in FIG. 10C, a wavy shape illustrated in FIG. 10D, and an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has the smallest curvature radius, for example, greater than or equal to 3 mm and less than or equal to 30 mm, preferably greater than or equal to 3 mm and less than or equal to 10 mm.

Next, a variety of examples of the stack of the positive electrode, the negative electrode, and the separator will be described.

Figure 13A:
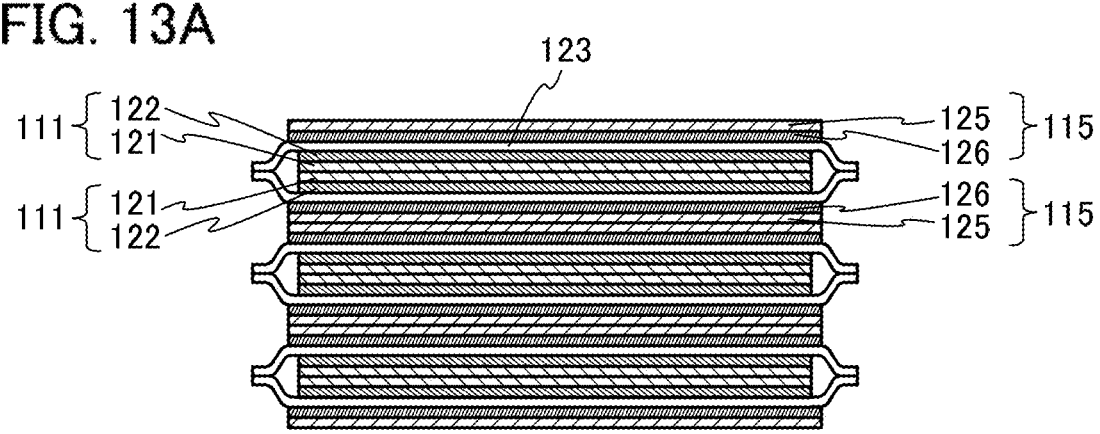
FIGS. 13A to 13C are parts of cross-sectional views of a storage battery.

FIG. 13A illustrates an example where six positive electrodes 111 and six negative electrodes 115 are stacked. One surface of a positive electrode current collector 121 included in a positive electrode 111 is provided with a positive electrode active material layer 122. One surface of a negative electrode current collector 125 included in a negative electrode 115 is provided with a negative electrode active material layer 126.

In the structure illustrated in FIG. 13A, the positive electrodes 111 and the negative electrodes 115 are stacked so that surfaces of the positive electrodes 111 on each of which the positive electrode active material layer 122 is not provided are in contact with each other and that surfaces of the negative electrodes 115 on each of which the negative electrode active material layer 126 is not provided are in contact with each other. When the positive electrodes 111 and the negative electrodes 115 are stacked in this manner, contact surfaces between metals can be formed; specifically, the surfaces of the positive electrodes 111 on each of which the positive electrode active material layer 122 is not provided can be in contact with each other, and the surfaces of the negative electrodes 115 on each of which the negative electrode active material layer 126 is not provided can be in contact with each other. The coefficient of friction of the contact surface between metals can be lower than that of a contact surface between the active material and the separator.

Therefore, when the secondary battery is curved, the surfaces of the positive electrodes 111 on each of which the positive electrode active material layer 122 is not provided slide on each other, and the surfaces of the negative electrodes 115 on each of which the negative electrode active material layer 126 is not provided slide on each other; thus, the stress due to the difference between the inner diameter and the outer diameter of a curved portion can be relieved. Here, the inner diameter of the curved portion refers to the radius of curvature of the inner surface of the curved portion in the exterior body 509 of the storage battery 500 in the case where the storage battery 500 is curved, for example. Therefore, the deterioration of the storage battery 500 can be inhibited. Furthermore, the storage battery 500 can have high reliability.

Figure 13B:
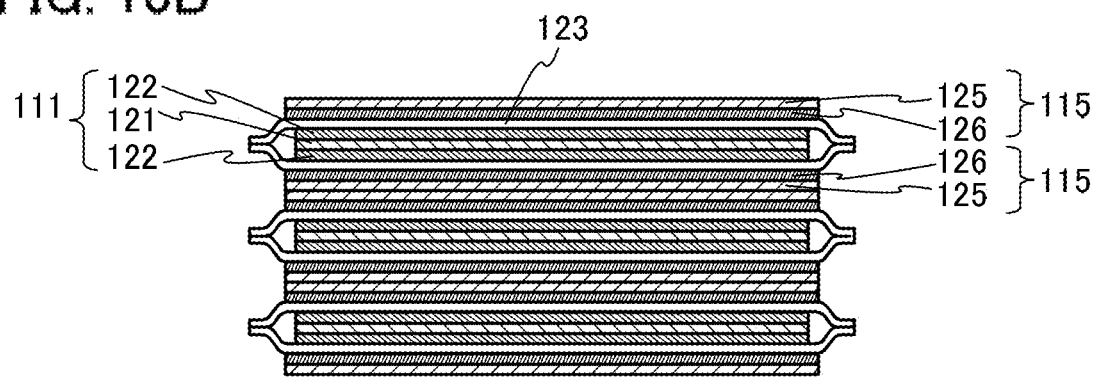

FIG. 13B illustrates an example of a stack of the positive electrodes 111 and the negative electrodes 115 which is different from that in FIG. 13A. The structure illustrated in FIG. 13B is different from that in FIG. 13A in that the positive electrode active material layers 122 are provided on both surfaces of the positive electrode current collector 121. When the positive electrode active material layers 122 are provided on both the surfaces of the positive electrode current collector 121 as illustrated in FIG. 13B, the capacity per unit volume of the storage battery 500 can be increased.

Figure 13C:
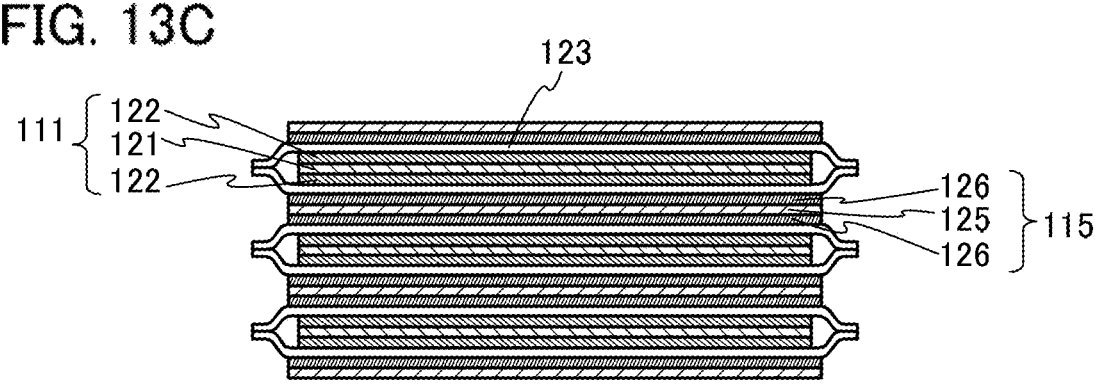

FIG. 13C illustrates an example of a stack of the positive electrodes 111 and the negative electrodes 115 which is different from that in FIG. 13B. The structure illustrated in FIG. 10C is different from that in FIG. 10B in that the negative electrode active material layers 126 are provided on both surfaces of the negative electrode current collector 125. When the negative electrode active material layers 126 are provided on both the surfaces of the negative electrode current collector 125 as illustrated in FIG. 10C, the capacity per unit volume of the storage battery 500 can be further increased.

Figure 14A:
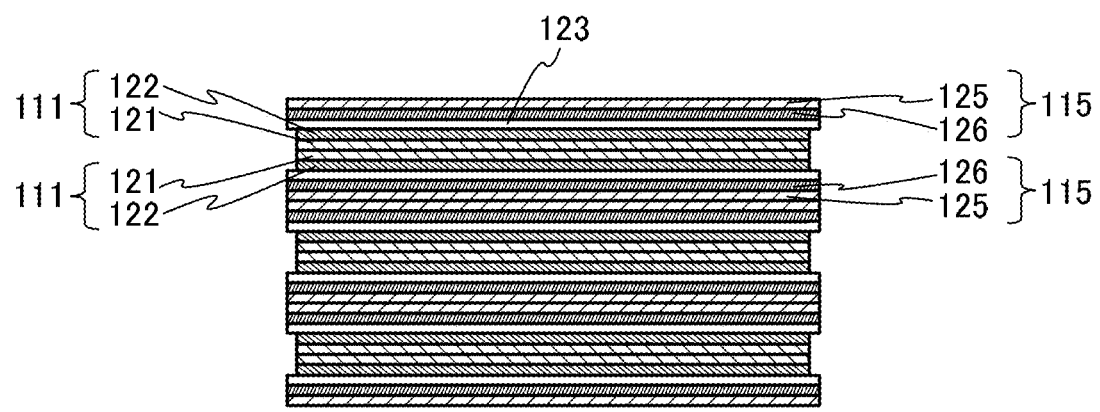
FIGS. 14A and 14B are parts of cross-sectional views of a storage battery.

In the structures illustrated in FIGS. 13A to 13C, a separator 123 has a bag-like shape by which the positive electrodes 111 are surrounded; however, one embodiment of the present invention is not limited thereto. FIG. 14A illustrates an example in which the separator 123 has a different structure from that in FIG. 13A. The structure illustrated in FIG. 14A is different from that in FIG. 13A in that a sheet-like separator 123 is provided between every pair of the positive electrode active material layer 122 and the negative electrode active material layer 126. In the structure illustrated in FIG. 14A, six positive electrodes 111 and six negative electrodes 115 are stacked, and six separators 123 are provided.

Figure 14B:
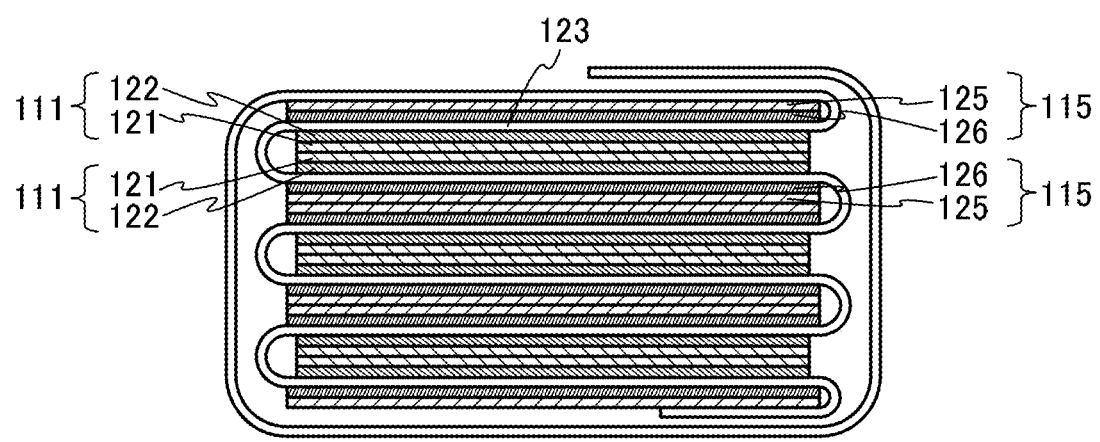

FIG. 14B illustrates an example in which the separator 123 different from that in FIG. 14A is provided. The structure illustrated in FIG. 14B is different from that in FIG. 14A in that one sheet of separator 123 is folded more than once to be interposed between every pair of the positive electrode active material layer 122 and the negative electrode active material layer 126. It can be said that the structure illustrated in FIG. 14B is a structure in which the separators 123 in the respective layers which are illustrated in FIG. 14A are extended and connected together between the layers. In the structure illustrated in FIG. 14B, six positive electrodes 111 and six negative electrodes 115 are stacked and the separator 123 is folded, for example, five times or more. The separator 123 is not necessarily provided so as to be interposed between every pair of the positive electrode active material layer 122 and the negative electrode active material layer 126, and the plurality of positive electrodes 111 and the plurality of negative electrodes 115 may be bound together by extending the separator 123.

Figure 15A:
FIGS. 15A to 15C are parts of cross-sectional views of a storage battery.
Figure 15B:
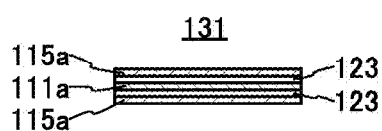
Figure 15C:
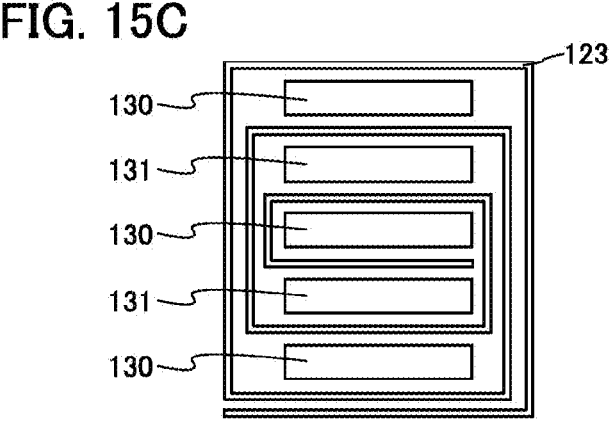

Note that the positive electrode, the negative electrode, and the separator may be stacked as illustrated in FIGS. 15A to 15C. FIG. 15A is a cross-sectional view of a first electrode assembly 130, and FIG. 15B is a cross-sectional view of a second electrode assembly 131. In FIG. 15C, the first electrode assembly 130, the second electrode assembly 131, and the separator 123 are selectively illustrated for the sake of clarity.

As illustrated in FIG. 15C, the storage battery 500 includes a plurality of first electrode assemblies 130 and a plurality of second electrode assemblies 131.

As illustrated in FIG. 15A, in each of the first electrode assemblies 130, a positive electrode 111a including the positive electrode active material layers 122 on both surfaces of a positive electrode current collector 121, the separator 123, a negative electrode 115a including the negative electrode active material layers 126 on both surfaces of a negative electrode current collector 125, the separator 123, and the positive electrode 111a including the positive electrode active material layers 122 on both surfaces of the positive electrode current collector 121 are stacked in this order. As illustrated in FIG. 15B, in each of the second electrode assemblies 131, the negative electrode 115a including the negative electrode active material layers 126 on both surfaces of the negative electrode current collector 125, the separator 123, the positive electrode 111a including the positive electrode active material layers 122 on both surfaces of the positive electrode current collector 121, the separator 123, and the negative electrode 115a including the negative electrode active material layers 126 on both surfaces of the negative electrode current collector 125 are stacked in this order.

As illustrated in FIG. 15C, the plurality of first electrode assemblies 130 and the plurality of the second electrode assemblies 131 are covered with the wound separator 123.

[Coin-Type Storage Battery]

Figure 11A:
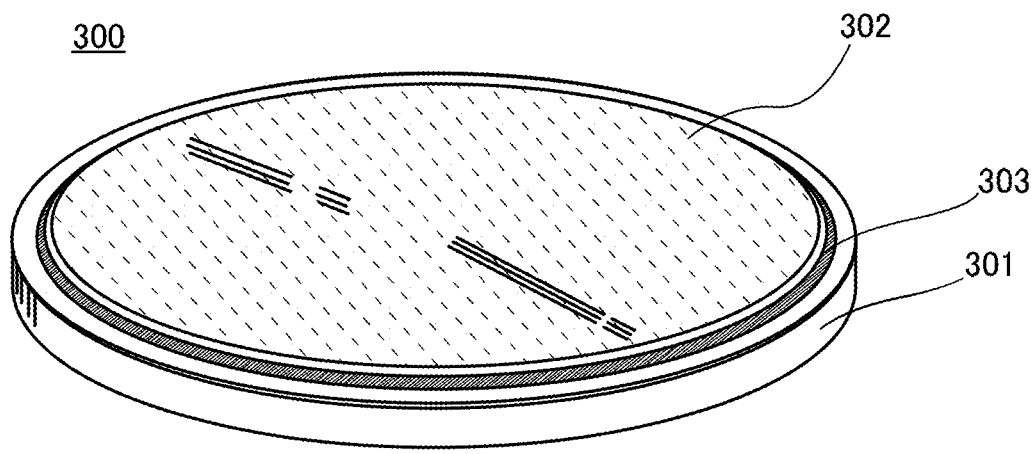
FIGS. 11A and 11B illustrate a coin-type storage battery.
Figure 11B:
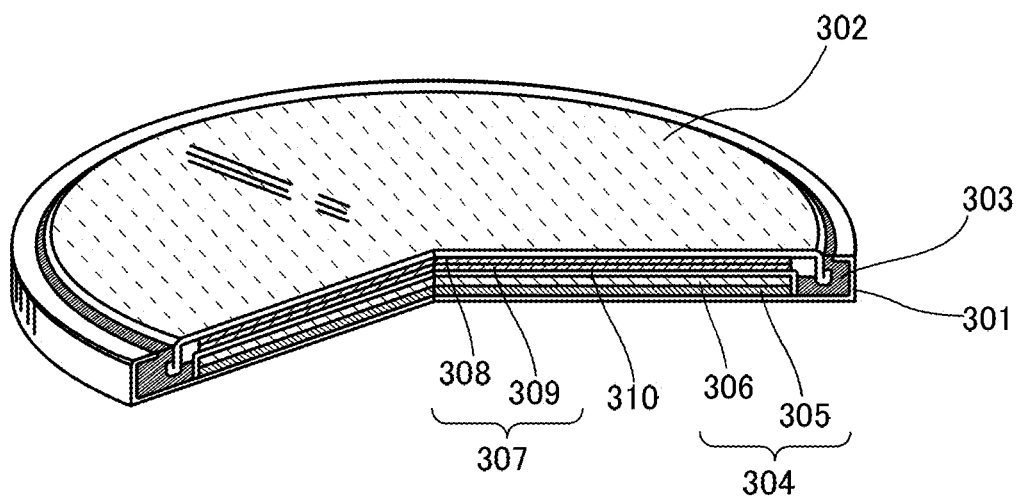

Next, an example of a coin-type storage battery will be described as an example of a power storage device with reference to FIGS. 11A and 11B. FIG. 11A is an external view of a coin-type (single-layer flat type) storage battery, and FIG. 11B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305.

A negative electrode 307 includes a negative electrode current collector 308 and a negative electrode active material layer 309 provided in contact with the negative electrode current collector 308.

The description of the positive electrode 503 can be referred to for the positive electrode 304. The description of the positive electrode active material layer 502 can be referred to for the positive electrode active material layer 306. The description of the negative electrode 506 can be referred to for the negative electrode 307. The description of the negative electrode active material layer 505 can be referred to for the negative electrode active material layer 309. The description of the separator 507 can be referred to for a separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 11B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

[Cylindrical Storage Battery]

Figure 12A:
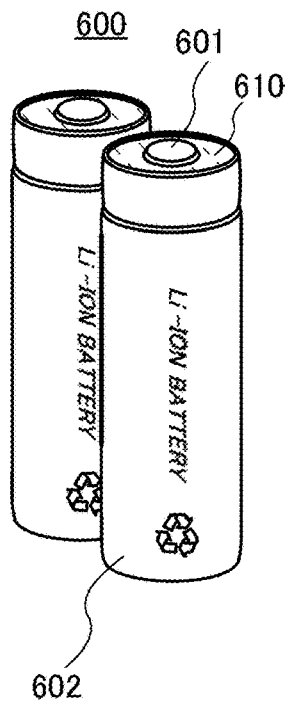
FIGS. 12A and 12B illustrate a cylindrical storage battery.

Next, an example of a cylindrical storage battery will be described as an example of a power storage device. The cylindrical storage battery will be described with reference to FIGS. 12A and 12B. As illustrated in FIG. 12A, a cylindrical storage battery 600 includes a positive electrode cap (battery cap) 601 on the upper surface and a battery can (outer can) 602 on the side surface and bottom surface. The positive electrode cap and the battery can (outer can) 602 are insulated from each other by a gasket (insulating gasket) 610.

Figure 12B:
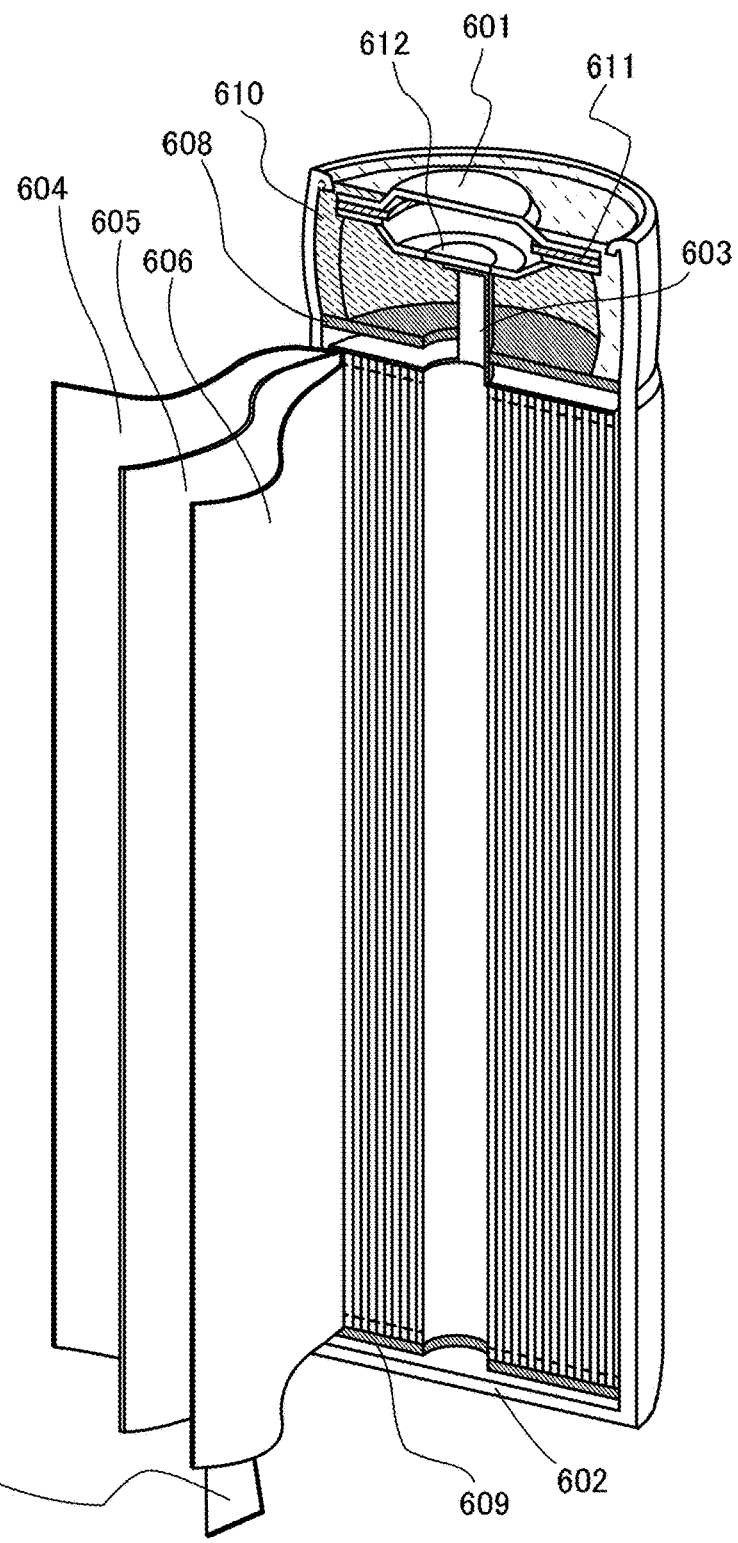

FIG. 12B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a strip-like separator 605 interposed therebetween is provided. Although not illustrated, the battery element is wound around a center pin. One end of the battery can 602 is closed and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used.

The description of the positive electrode 503 can be referred to for the positive electrode 604. The description of the negative electrode 506 can be referred to for the negative electrode 606. The description of the method for manufacturing an electrode that is described in Embodiment 1 can be referred to for the positive electrode 604 and the negative electrode 606. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

In the case where an electrode is wound as in the cylindrical storage battery illustrated in FIGS. 12A and 12B, a great stress is caused at the tune of winding the electrode. In addition, an outward stress from an axis of winding is applied to the electrode all the time in the case where a wound body of the electrode is provided in a housing. However, the active material can be prevented from being cleaved even when such a great stress is applied to the electrode.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or a structure in which a positive electrode, a negative electrode, and a separator are wound may be employed. For example, FIGS. 21A to 21G to FIGS. 29A to 29C illustrate examples of other storage batteries.

[Structural Example of Thin Storage Battery]

FIGS. 16A to 16C and FIGS. 17A to 17C illustrate structural examples of thin storage batteries. A wound body 993 illustrated in FIG. 16A includes a negative electrode 994, a positive electrode 995, and a separator 996.

The wound body 993 is obtained by winding a sheet of a stack in which the negative electrode 994 overlaps with the positive electrode 995 with the separator 996 provided therebetween. The wound body 993 is covered with a rectangular sealed container or the like; thus, a rectangular secondary battery is manufactured.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 16A:
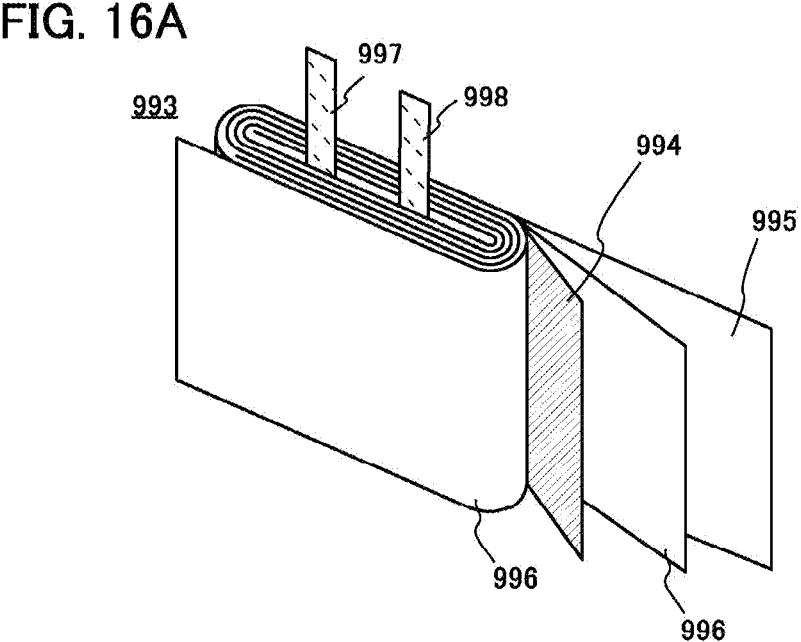
FIGS. 16A to 16C illustrate an example of a storage battery.
Figure 16B:
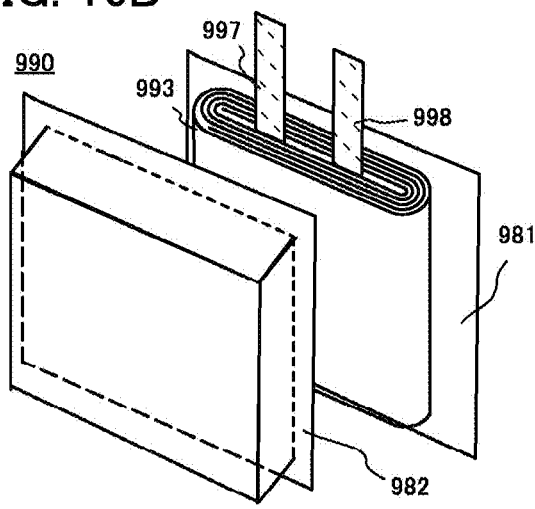
Figure 16C:
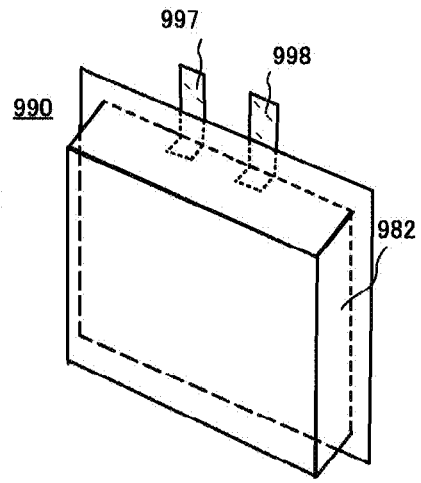

In a storage battery 980 illustrated in FIGS. 16B and 16C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be manufactured.

Although FIGS. 16B and 16C illustrate an example where a space is formed by two films, the wound body 993 may be placed in a space formed by bending one film.

Furthermore, in manufacturing a flexible power storage device, a resin material or the like can be used for an exterior body and a sealed container of the power storage device. Note that in the case where a resin material is used for the exterior body and the sealed container, a conductive material is used for a portion connected to the outside.

Figure 17A:
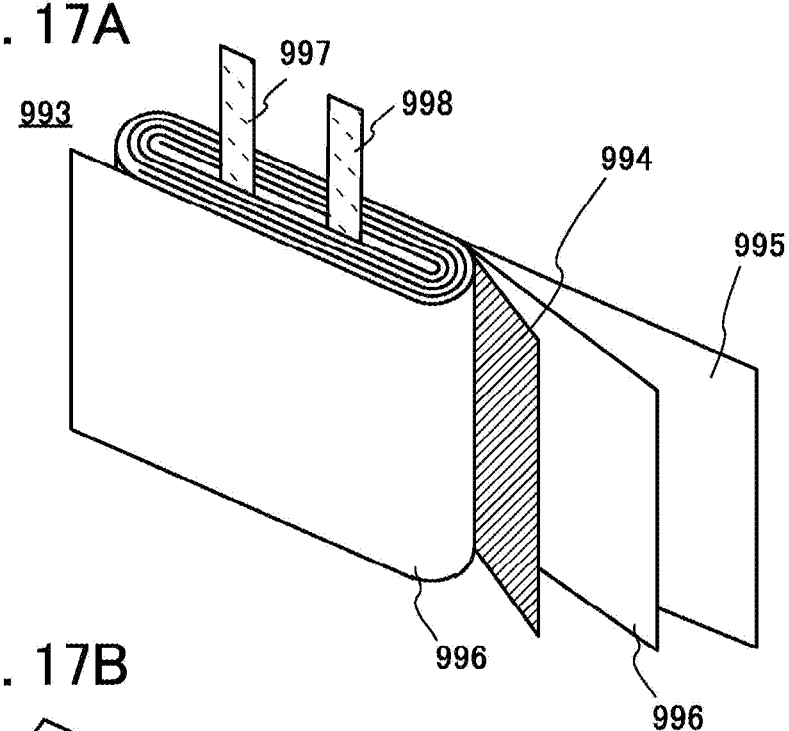
FIGS. 17A to 17C illustrate an example of a storage battery.
Figure 17B:
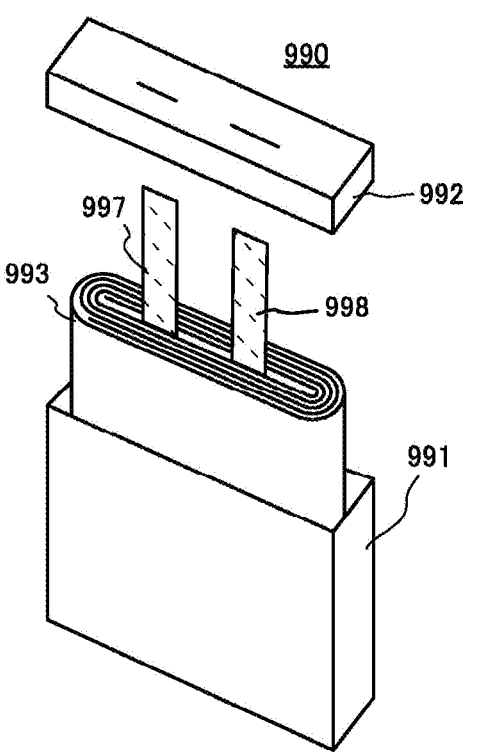
Figure 17C:
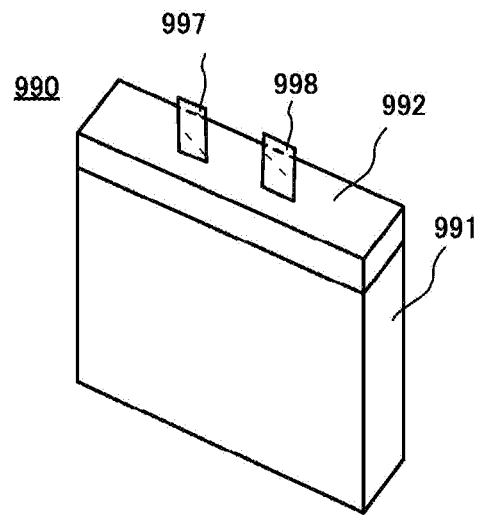

For example, FIGS. 17A to 17C illustrate another example of a flexible thin storage battery. The wound body 993 illustrated in FIG. 17A is the same as that illustrated in FIG. 16A, and the detailed description thereof is omitted.

In the storage battery 990 illustrated in FIGS. 17B and 17C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be manufactured.

When the electrode including the active material of one embodiment of the present invention is used in the flexible thin storage battery, the active material can be prevented from being cleaved even if a stress caused by repeated bending of the thin storage battery is applied to the electrode.

When the active material in which at least part of the cleavage plane is covered with graphene is used for an electrode as described above, a decrease in the voltage and discharge capacity of a battery can be prevented. Accordingly, the charge-discharge cycle characteristics of the battery can be improved.

[Structural Example of Power Storage System]

Structural examples of power storage systems will be described with reference to FIGS. 18A and 18B to FIGS. 20A and 20B. Here, a power storage system refers to, for example, a device including a power storage device.

Figure 18A:
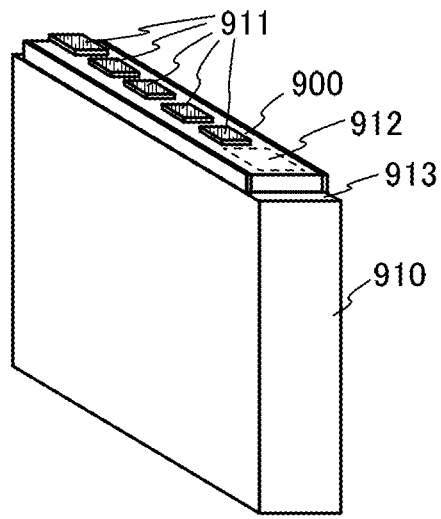
FIGS. 18A and 18B illustrate an example of a power storage system.
Figure 18B:
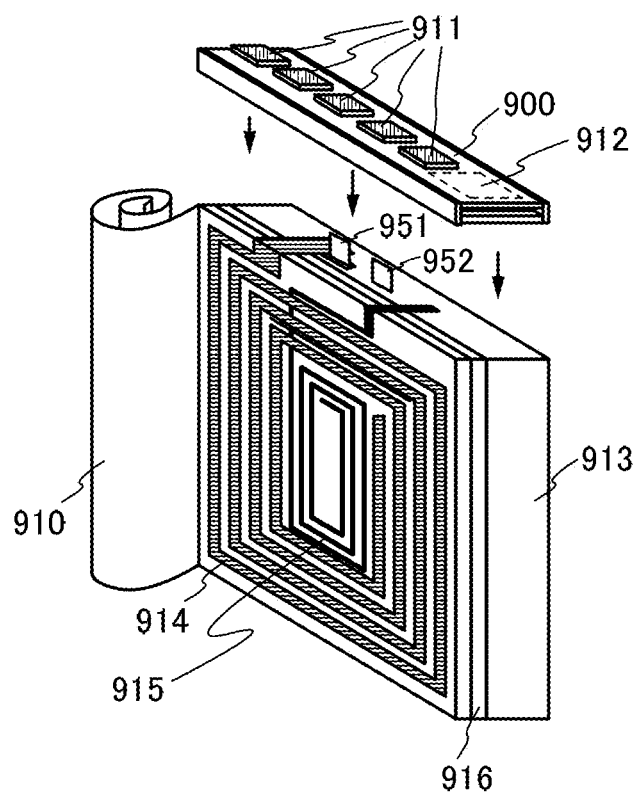

FIGS. 18A and 18B are external views of a power storage system. The power storage system includes a circuit board 900 and a storage battery 913. A label 910 is attached to the storage battery 913. As shown in FIG. 18B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 18A and 18B.

Figure 2:
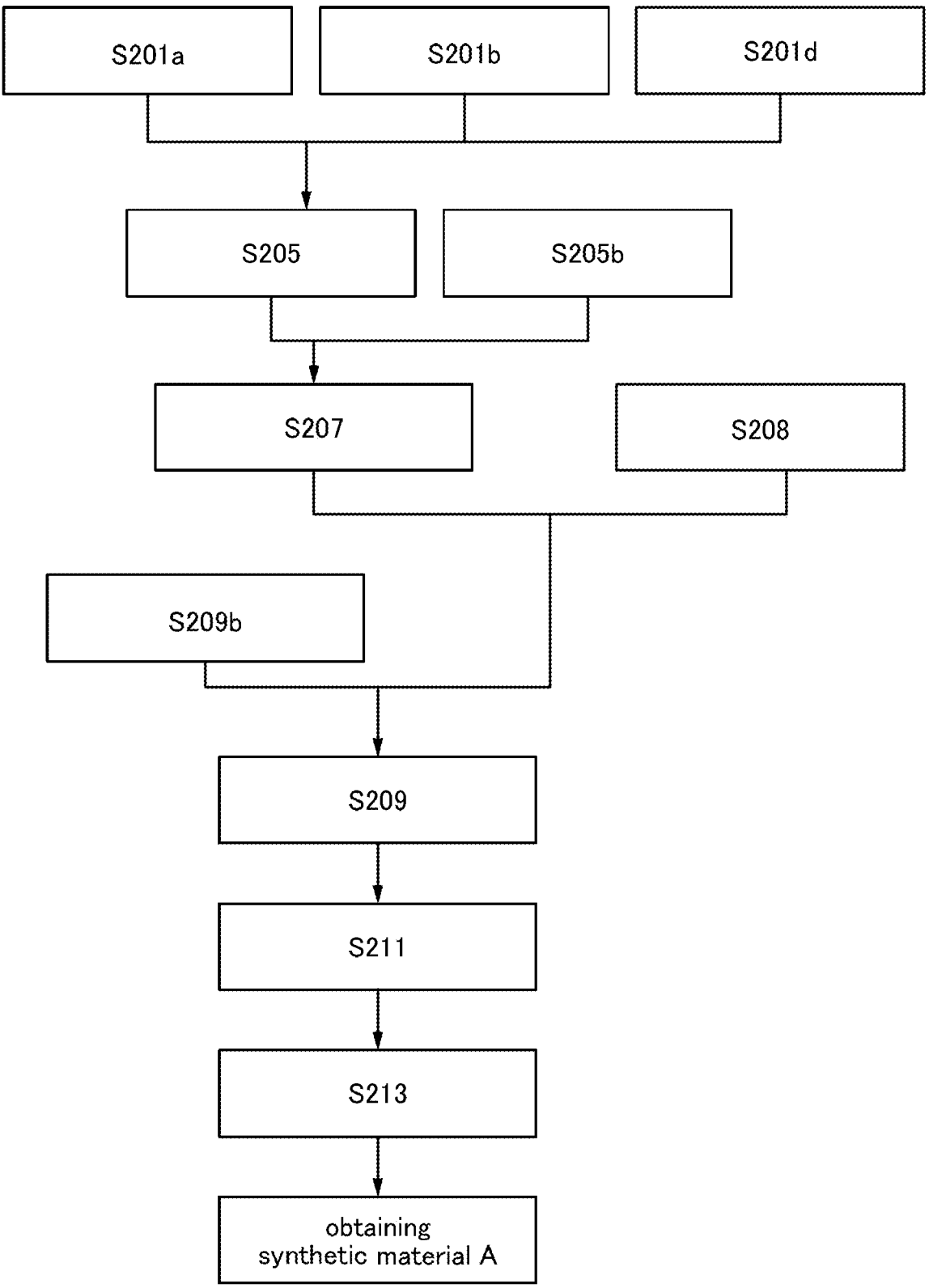
FIG. 2 is a flow chart showing a method of manufacturing a positive electrode active material.
Figures 1, 19A:
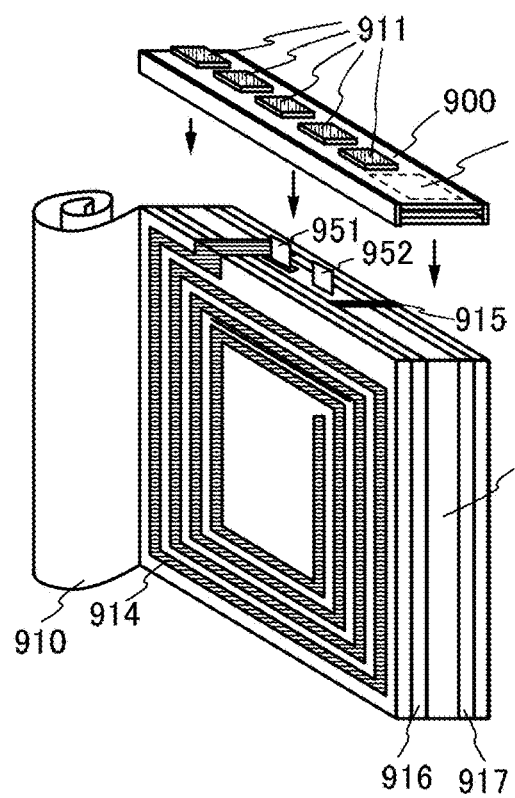
Figures 2, 19A:
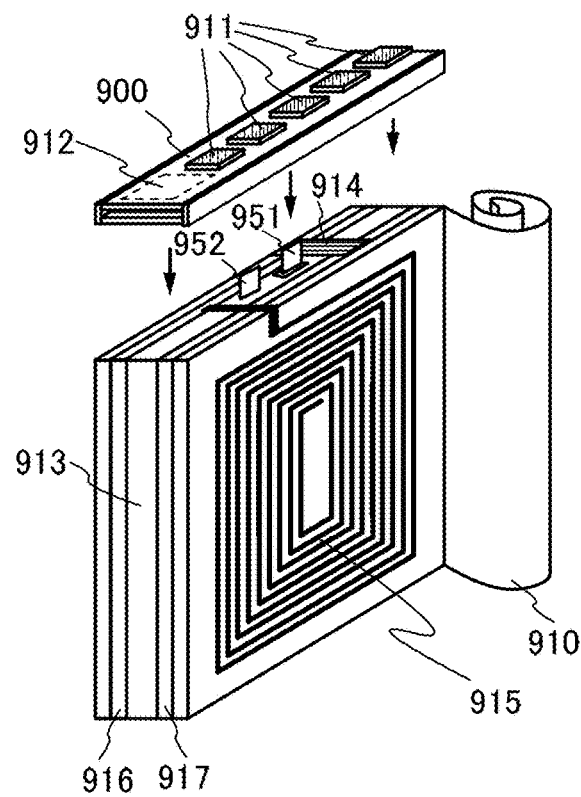

For example, as shown in FIGS. 19A-1 and 19A-2, two opposite surfaces of the storage battery 913 in FIGS. 18A and 18B may be provided with respective antennas. FIG. 19A-1 is an external view showing one side of the opposite surfaces, and FIG. 19A-2 is an external view showing the other side of the opposite surfaces. For portions similar to those in FIGS. 18A and 18B, the description of the power storage system illustrated in FIGS. 18A and 18B can be referred to as appropriate.

As illustrated in FIG. 19A-1, the antenna 914 is provided on one of the opposite surfaces of the storage battery 913 with the layer 916 interposed therebetween, and as illustrated in FIG. 19A-2, the antenna 915 is provided on the other of the opposite surfaces of the storage battery 913 with a layer 917 interposed therebetween. The layer 917 may have a function of blocking an electromagnetic field by the storage battery 913. As the layer 917, for example, a magnetic body can be used.

With the above structure, both of the antennas 914 and 915 can be increased in size.

Figures 1, 19B:
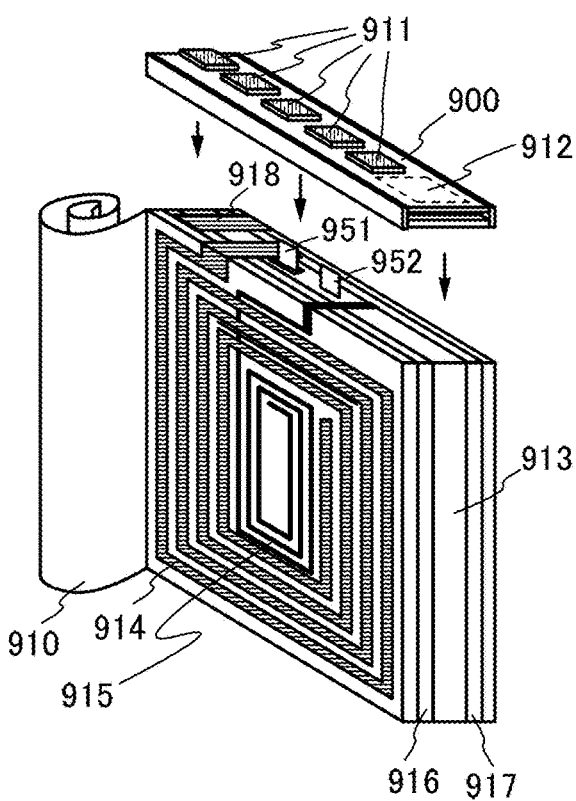
Figures 2, 19B:
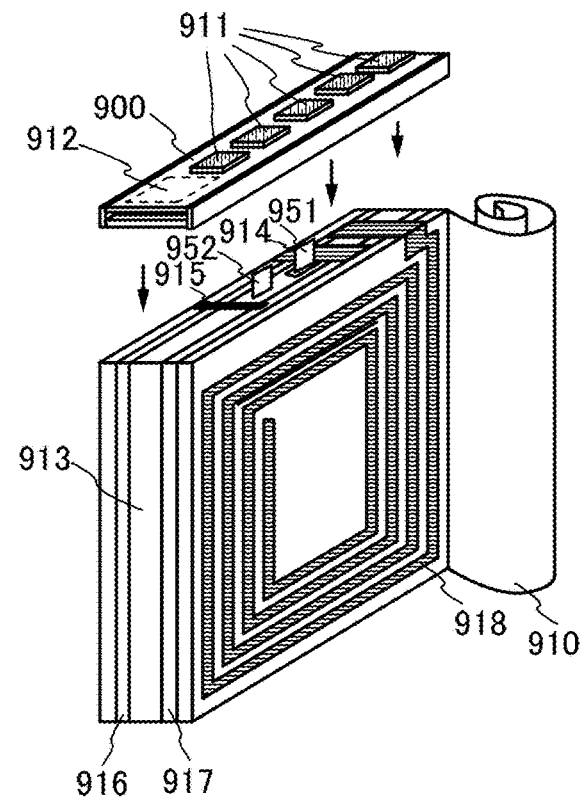

Alternatively, as illustrated in FIGS. 19B-1 and 19B-2, two opposite surfaces of the storage battery 913 in FIGS. 18A and 18B may be provided with different types of antennas. FIG. 19B-1 is an external view showing one side of the opposite surfaces, and FIG. 19B-2 is an external view showing the other side of the opposite surfaces. For portions similar to those in FIGS. 18A and 18B, the description of the power storage system illustrated in FIGS. 18A and 18B can be referred to as appropriate.

As illustrated in FIG. 19B-1, the antennas 914 and 915 are provided on one of the opposite surfaces of the storage battery 913 with the layer 916 interposed therebetween, and as illustrated in FIG. 19B-2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 20A:
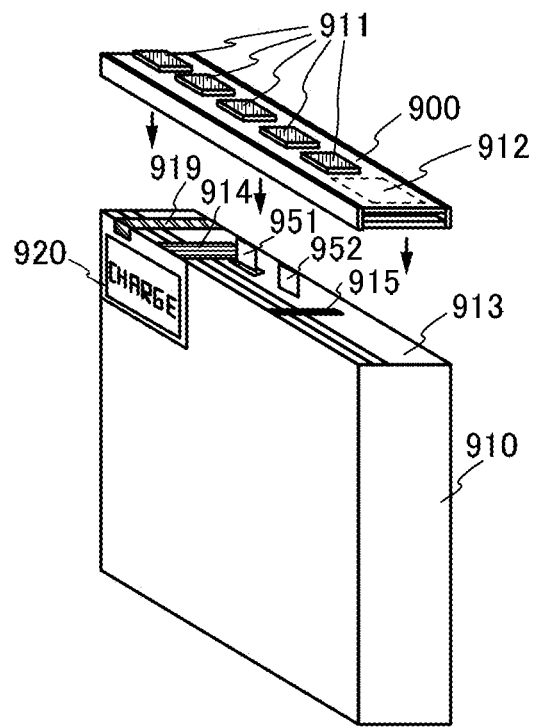
FIGS. 20A and 20B illustrate an example of a power storage system.

Alternatively, as illustrated in FIG. 20A, the storage battery 913 in FIGS. 18A and 18B may be provided with a display device 920. The display device 920 is electrically connected to the terminal 911 via a terminal 919. It is possible that the label 910 is not provided in a portion where the display device 920 is provided. For portions similar to those in FIGS. 18A and 18B, the description of the power storage system illustrated in FIGS. 18A and 18B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 20B:
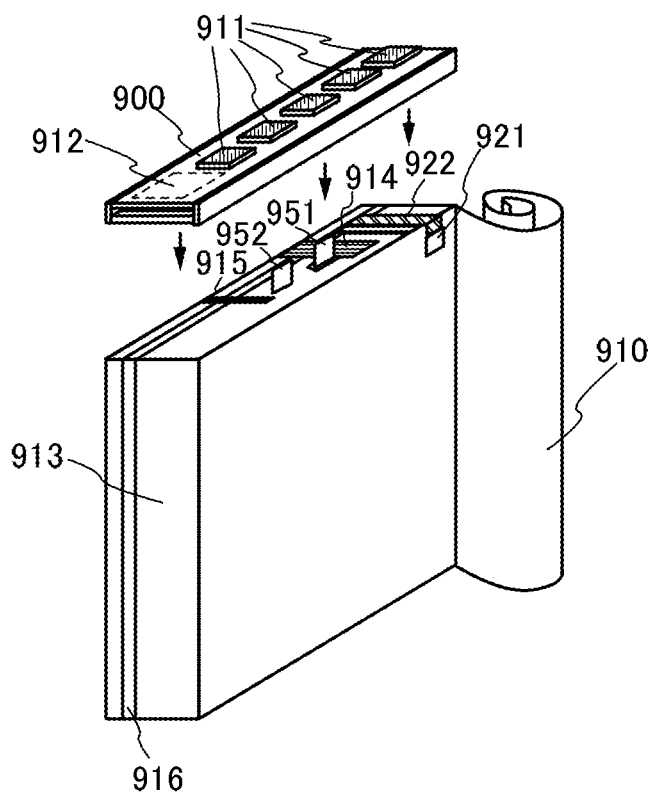

Alternatively, as illustrated in FIG. 20B, the storage battery 913 illustrated in FIGS. 18A and 18B may be provided with a sensor 921. The sensor 921 is electrically connected to the terminal 911 via a terminal 922. For portions similar to those in FIGS. 18A and 18B, the description of the power storage system illustrated in FIGS. 18A and 18B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system of one embodiment of the present invention. Thus, the capacity of the storage battery and the power storage system can be high. Furthermore, the energy density can be high. Moreover, reliability can be high, and life can be long.

This embodiment can be implemented in appropriate combination with any of the other embodiments.

Embodiment 4

In this embodiment, an example of an electronic device including a flexible storage battery will be described.

FIGS. 21A to 21G illustrate examples of electronic devices including the flexible power storage device described in Embodiment 2. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 21A:
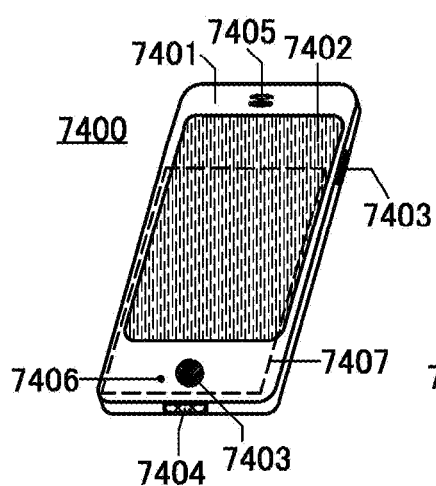
FIGS. 21A to 21G illustrate examples of electronic devices.

FIG. 21A is an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 21B:
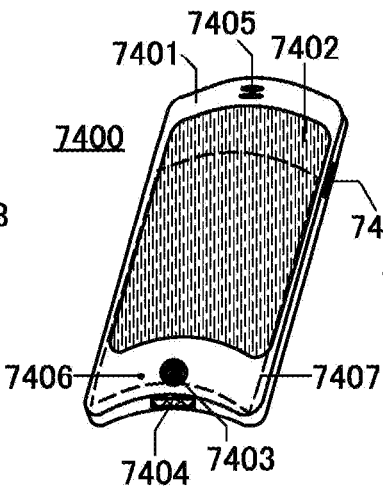
Figure 21C:
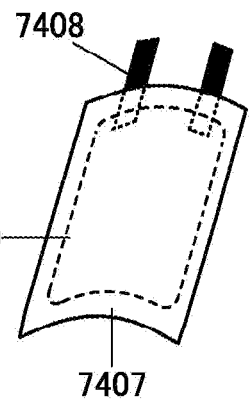

FIG. 21B illustrates the mobile phone 7400 that is curved. When the whole mobile phone 7400 is bent by the external force, the power storage device 7407 included in the mobile phone 7400 is also bent. FIG. 21C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium thus, adhesion between the current collector 7409 and an active material layer in contact with the current collector 7409 is improved and the power storage device 7407 can have high reliability even in a state of being bent.

Figure 21D:
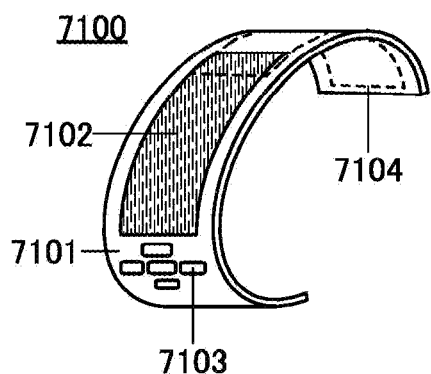
Figure 21E:
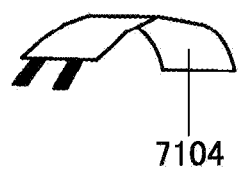

FIG. 21D illustrates an example of a bangle display device. A portable display device 7100 includes a housing 7101, a display portion 7102, an operation button 7103, and a power storage device 7104. FIG. 21E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm inclusive. When the radius of curvature at the main surface of the power storage device 7104 is greater than or equal to 40 mm and less than or equal to 150 mm, the reliability can be kept high.

Figure 21F:
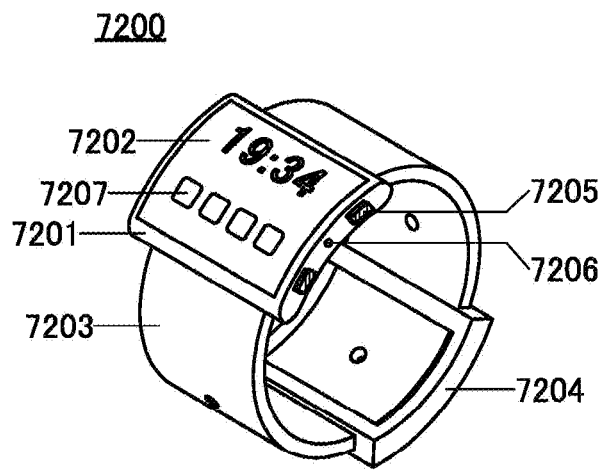

FIG. 21F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 21E that is in the state of being curved can be provided in the housing 7201. Alternatively, the power storage device 7104 illustrated in FIG. 21E can be provided in the band 7203 such that it can be curved.

The portable information terminal 7200 preferably includes a sensor. As the sensor, for example a human body sensor such as a fingerprint sensor, a pulse sensor, or a temperature sensor, a touch sensor, a pressure sensitive sensor, an acceleration sensor, or the like is preferably mounted.

Figure 21G:
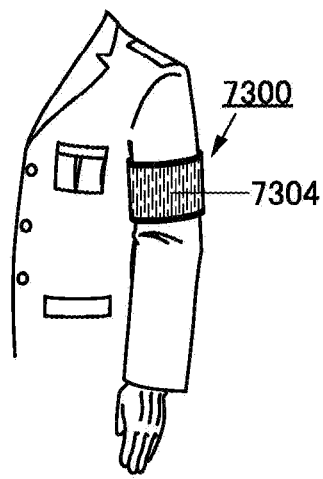

FIG. 21G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be combined with any of the other embodiments as appropriate.

Embodiment 5

In this embodiment, examples of electronic devices that can include power storage devices will be described.

Figure 22A:
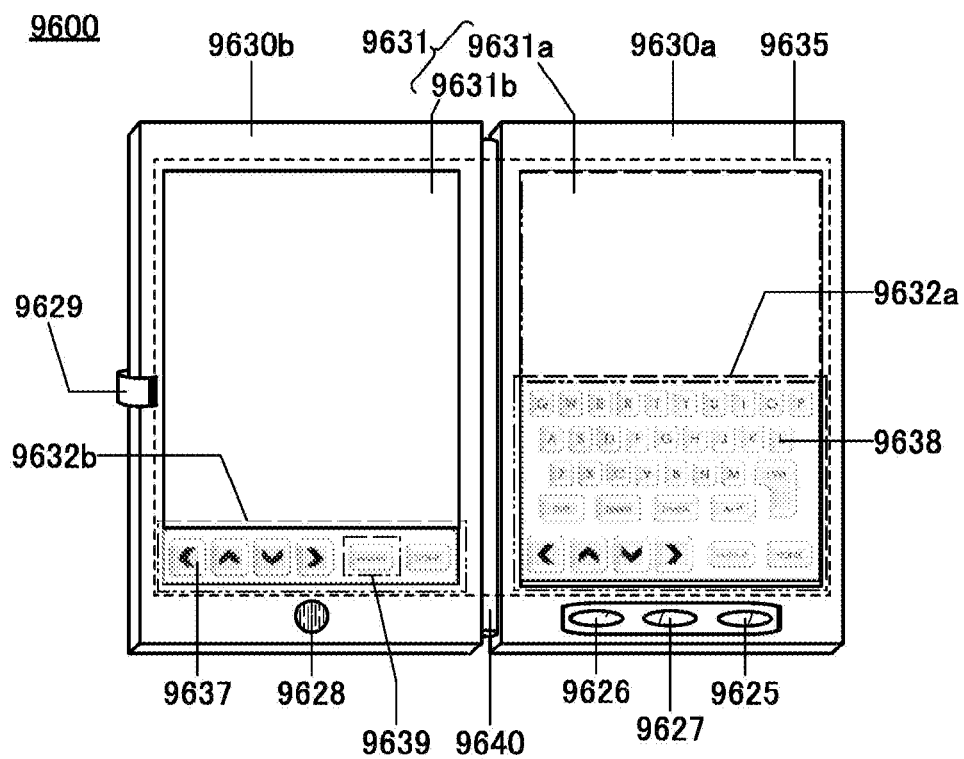
FIGS. 22A to 22C illustrate an example of an electronic device.
Figure 22B:
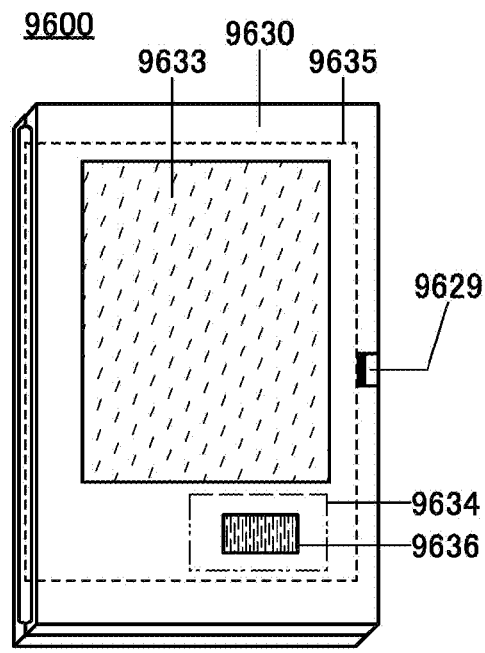

FIGS. 22A and 22B illustrate an example of a tablet terminal that can be folded in half. A tablet terminal 9600 illustrated in FIGS. 22A and 22B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 22A illustrates the tablet terminal 9600 that is opened, and FIG. 22B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631a can be a touch panel region 9632a and data can be input when a displayed operation key 9638 is touched. Although a structure in which a half region in the display portion 9631a has only a display function and the other half region has a touch panel function is shown as an example, the display portion 9631a is not limited to the structure. The whole region in the display portion 9631a may have a touch panel function. For example, the display portion 9631a can display keyboard buttons in the whole region to be a touch panel, and the display portion 9631b can be used as a display screen.

In the display portion 9631b, as in the display portion 9631a, part of the display portion 9631b can be a touch panel region 9632b. A switching button 9639 for showing/hiding a keyboard of the touch panel is touched with a finger, a stylus, or the like, so that keyboard buttons can be displayed on the display portion 9631b.

Touch input can be performed in the touch panel region 9632a and the touch panel region 9632b at the same time.

The display mode switch 9626 can switch the display between a portrait mode and a landscape mode, and between monochrome display and color display, for example. The power saving mode changing switch 9625 can control display luminance in accordance with the amount of external light in use of the tablet terminal 9600, which is measured with an optical sensor incorporated in the tablet terminal 9600. Another detection device including a sensor for detecting inclination, such as a gyroscope sensor or an acceleration sensor, may be incorporated in the tablet terminal, in addition to the optical sensor.

Although the display area of the display portion 9631a is the same as that of the display portion 9631b in FIG. 22A, one embodiment of the present invention is not particularly limited thereto. The display area of the display portion 9631a may be different from that of the display portion 9631b, and furthermore, the display quality of the display portion 9631a may be different from that of the display portion 9631b. For example, one display panel may be capable of higher-definition display than the other display panel.

The tablet terminal is closed in FIG. 22B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded in two such that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 22A and 22B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs and the like.

The solar battery 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 22C:
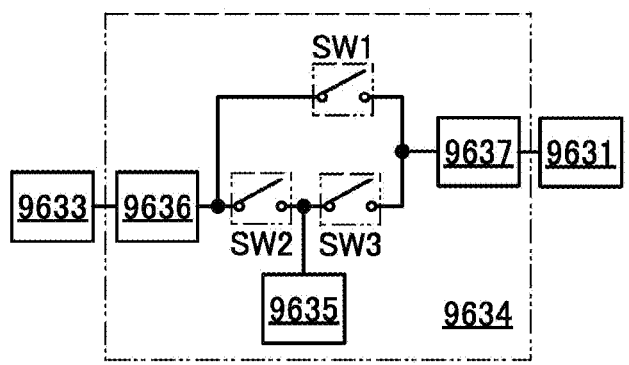

The structure and operation of the charge and discharge control circuit 9634 illustrated in FIG. 22B will be described with reference to a block diagram in FIG. 22C. The solar cell 9633, the power storage unit 9635, the DCDC converter 9636, a converter 9637, switches SW1 to SW3, and the display portion 9631 are illustrated in FIG. 22C, and the power storage unit 9635, the DCDC converter 9636, the converter 9637, and the switches SW1 to SW3 correspond to the charge and discharge control circuit 9634 in FIG. 22B.

First, an example of the operation in the case where power is generated by the solar cell 9633 using external light is described. The voltage of electric power generated by the solar cell is raised or lowered by the DCDC converter 9636 to a voltage for charging the power storage unit 9635. When the power from the solar battery 9633 is used for the operation of the display portion 9631, the switch SW1 is turned on and the voltage of the power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 23:
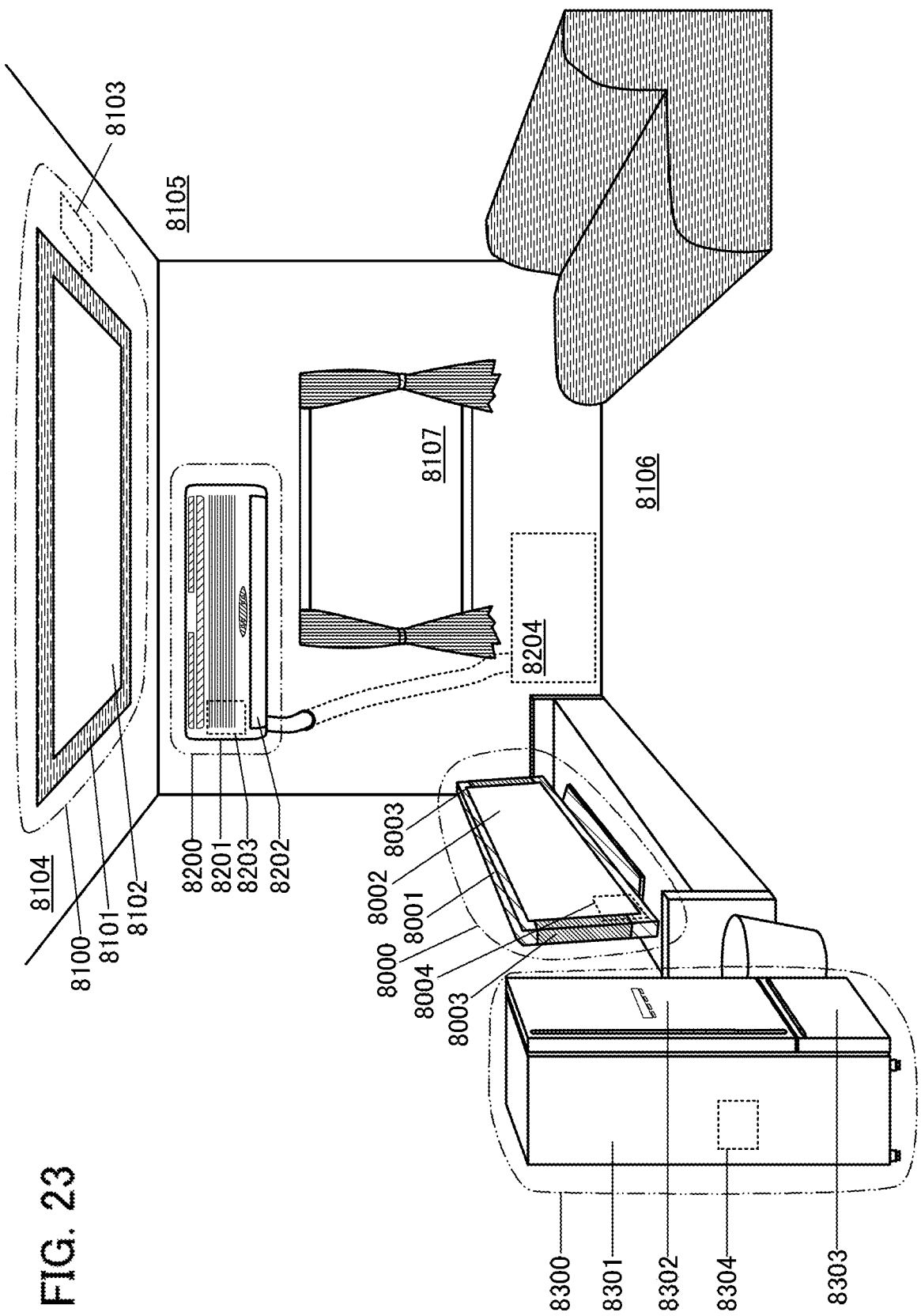
FIG. 23 illustrates examples of electronic device.

FIG. 23 illustrates other examples of electronic devices. In FIG. 23, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like other than TV broadcast reception.

In FIG. 23, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 23 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 23 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 23, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 23 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 23 as an example, the power storage device of one embodiment of the present invention can be used in an air conditioner in which the functions of an indoor unit and an outdoor unit are integrated in one housing.

In FIG. 23, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 23. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be combined with any of the other embodiments as appropriate.

Embodiment 6

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 24A:
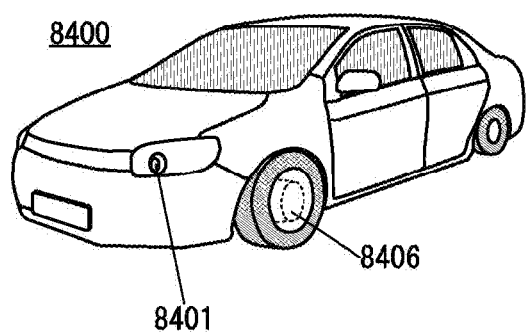
FIGS. 24A and 24B illustrate examples of electronic devices.
Figure 24B:
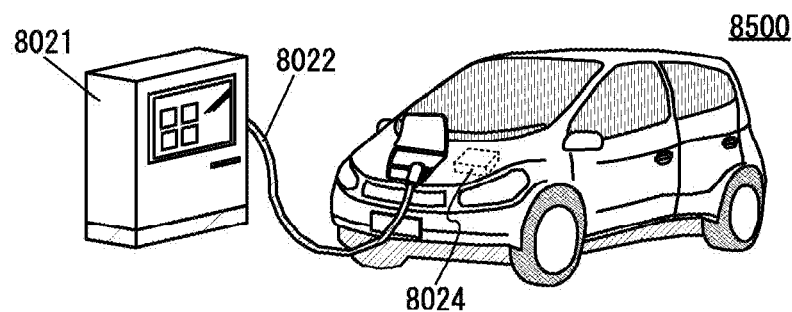

FIGS. 24A and 24B each illustrate an example of a vehicle using one embodiment of the present invention. An automobile 8400 illustrated in FIG. 244 is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the power storage device. The power storage device is used not only for driving an electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 24B illustrates an automobile 8500 including the power storage device. The automobile 8500 can be charged when the power storage device is supplied with electric power through external charging equipment by a plug-in system, a contactless power feeding system, or the like. In FIG. 24B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be combined with any of the other embodiments as appropriate.

EXAMPLE 1

In this example, a manufacturing method of the positive electrode active material of one embodiment of the present invention is described.

Samples A1, C1, and C2 which are the positive electrode active materials of one embodiment of the present invention were manufactured based on the flow chart shown in FIG. 2. Note that in the case where the same conditions were used for manufacturing the three samples described below, the description will be omitted.

As lithium compound, LiCl was weighed to be 6.359 g in Step S201a. As the phosphorus compound, $H_3PO_4$ was weighed to be 3.41 ml in Step S201b. The number of moles of lithium was set to be three times that of phosphorus. As the solvent, pure water was weighed to be 50 ml in Step S201d.

Then, LiCl and $H_3PO_4$ were put into pure water, so that the mixed solution A was formed in Step S205. Step S205 was performed in an air atmosphere. Note that while being stirred with a stirring means or the like, materials and the like were put into pure water during the formation of the mixed solution.

Then, as the solution Q, ammonia water with a concentration of 28 wt % was prepared in Step S205b.

After that, the solution Q was dropped into the mixed solution A and pH measurement was performed in Step S207. The solution Q is dropped until pH becomes a desired one, so that the mixed solution B was formed. Here, pH of each sample was adjusted so that the concentrations of a mixed solution C, described later, were the values shown in Table 1. For pH measurement, a SevenGo Duo pH meter produced by Mettler-Toledo International Inc. was used.

Then, as the M(II) compound, $FeCl_2.4H_2O$ was weighed to be 9.941 g in Step S208. The number of moles of iron was equal to that of phosphorus. As the solvent, water was weighed in Step S209b.

After that, each of the several types of mixed solutions B with different pH was mixed with the mixed solution B, $FeCl_2.4H_2O$, and pure water, so that the mixed solution C was formed in Step S209. Table 1 shows of the mixed solution C in each of the samples.

TABLE 1

|    | Temperature [° C.] | pH   |
|----|--------------------|------|
| A1 | 180° C.            | 4.28 |
| C1 | 150° C.            | 3.92 |
| C2 | 150° C.            | 6.5  |

Next, in Step S211, the mixed solution C was put into an autoclave including an inner glass cylinder and was shut in and mixed. As for Sample A1, heating was performed at 180° C. for one hour, as for Sample C1, heating was performed at 150° C. for one hour, and as for Sample C2, heating was performed at 150° C. for one hour. During heating, the pressure inside the inner cylinder was approximately 0.4 MPa to 0.5 MPa at 150° C. and approximately 0.9 MPa to 1.0 MPa at 180° C. After the heat treatment was performed, the heated mixed solution C was left until the temperature fell and the synthetic material inside the inner cylinder was filtered and the residue was washed with water. For the autoclave, a mini reactor MS200-C manufactured by OM labotech Corp. was used.

Next, the washed object was dried in a reduced-pressure atmosphere at 60° C. for two hours, so that Samples A1, C1, and C2 including a powdery $LiFePO_4$ were obtained. Sample A1 had a gray powder, Sample C1 had a slightly darker gray powder than Sample A1, and Sample C2 had a slightly greenish gray powder.

EXAMPLE 2

Analysis results of Samples A1, C1, and C2 manufactured in Example 1 are described in this example.

<SEM Observation>

Figure 25A:
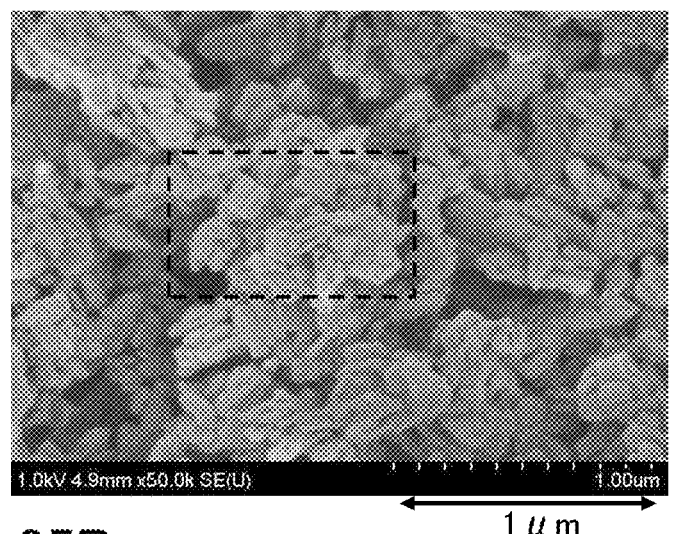
FIGS. 25A to 25C show a SEM observation result of a positive electrode active material.
Figure 25B:
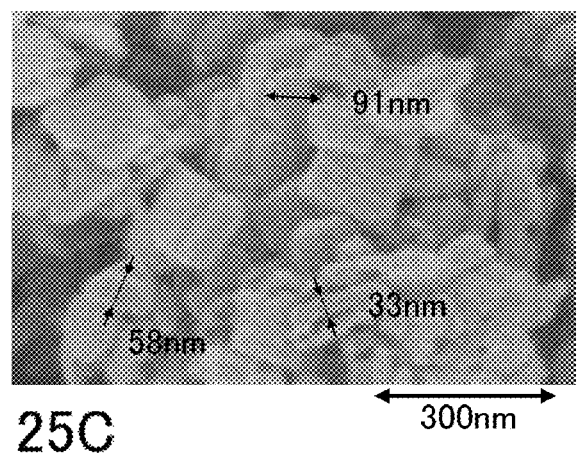
Figure 25C:
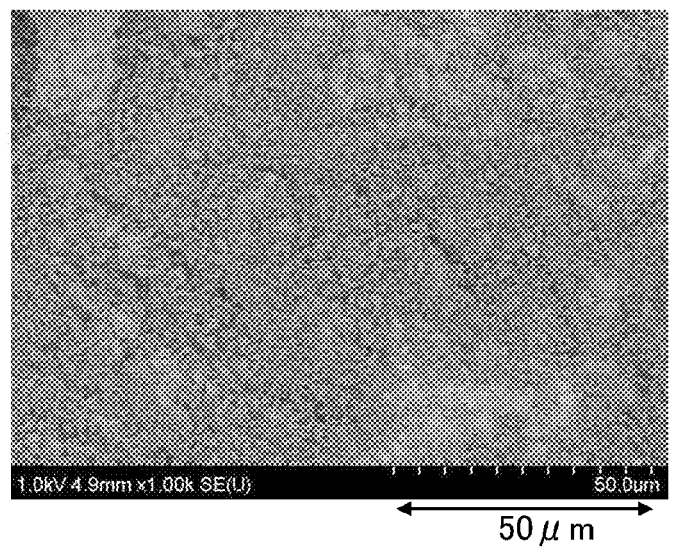
Figure 26A:
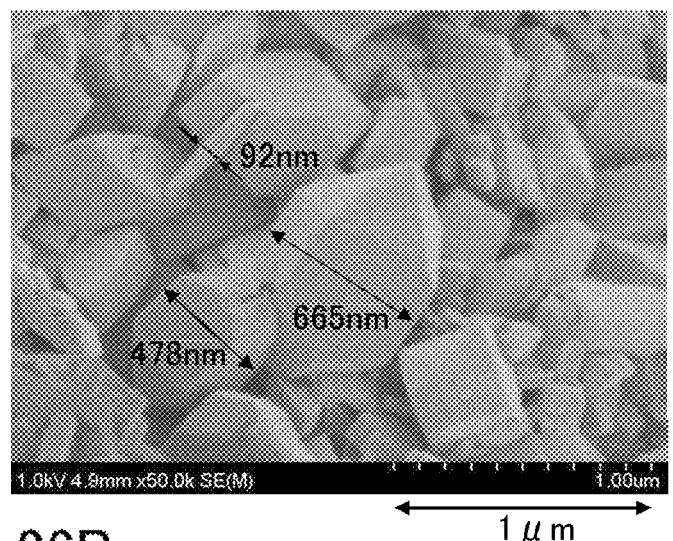
FIGS. 26A and 26B show a SEM observation result of a positive electrode active material.
Figure 26B:
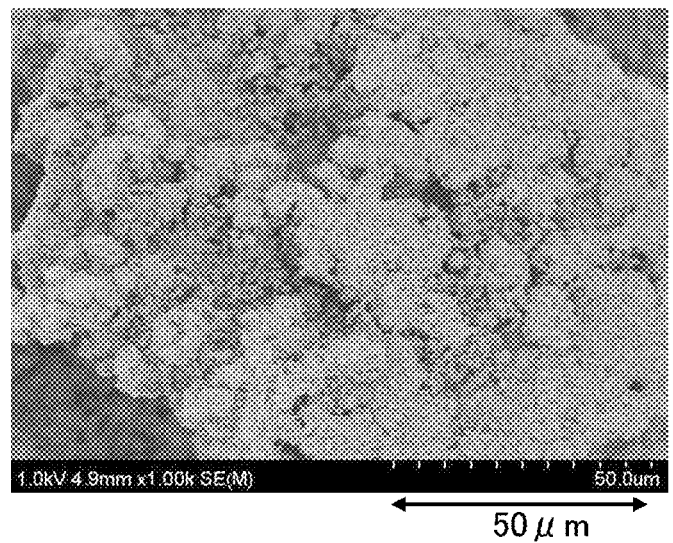
Figure 27A:
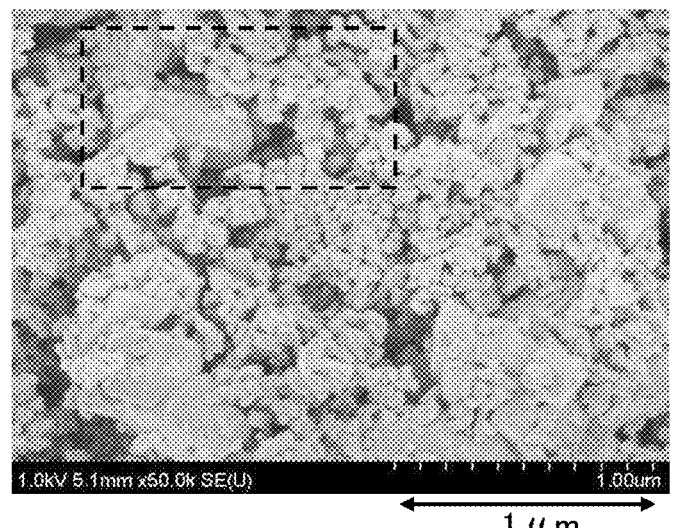
FIGS. 27A to 27C show a SEM observation result of a positive electrode active material.
Figure 27B:
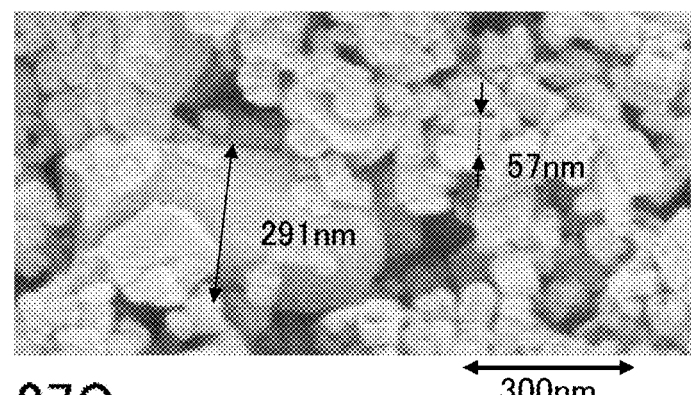
Figure 27C:
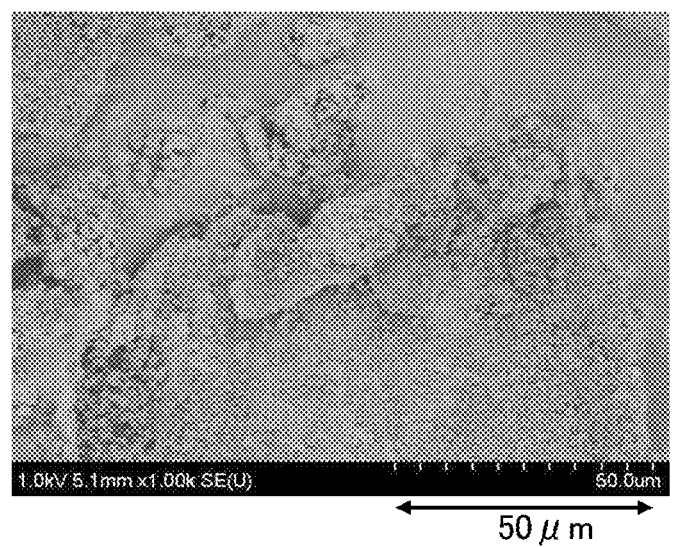

Each sample was observed with the use of SEM. The observation results of Samples A1, C1, and C2 are shown in FIGS. 25A to 25C, FIGS. 26A and 26B, and FIGS. 27A to 27C, respectively. FIGS. 25A, 26A, and 27A show observation results at a magnification of 50,000 times and FIGS. 25C, 26C, and 27C show observation results at a magnification of 1,000 times. FIG. 25B is an enlarged view of a region surrounded by dotted lines in FIG. 25A, FIG. 26B is an enlarged view of a region surrounded by dotted lines in FIG. 26A, and FIG. 27B is an enlarged view of a region surrounded by dotted lines in FIG. 27A. The two particles included in Sample A1 were measured in FIG. 25B and the minor diameters were 58 nm and 33 nm. The two particles included in Sample C1 were measured in FIG. 26B, and the minor diameters were 478 nm and 665 nm. The two particles included in Sample C2 were measured in FIG. 27B, the minor diameters were 291 nm and 57 nm.

Hereinafter, the major diameter and the minor diameter of the particles were calculated more specifically.

FIG. 1A illustrates groups 202a, 202b, and 202c of the particles in the observation result of Sample A1 illustrated in FIG. 25B. Particles included in the groups 202a, 202b, and 202c are schematically illustrated in FIG. 1B.

Figure 28:
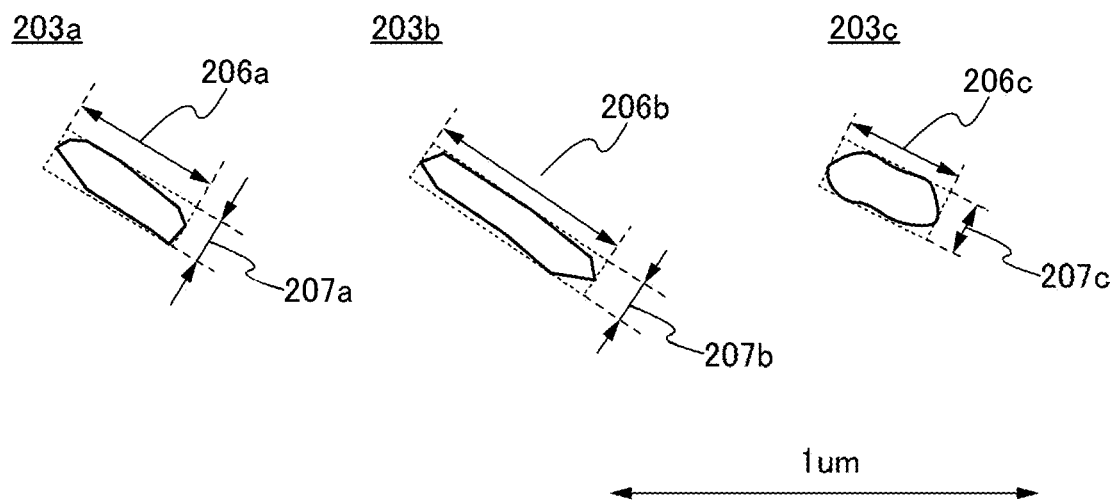
FIG. 28 shows a major diameter and a minor diameter of a particle.

FIG. 28 shows an example of major diameters and minor diameters in the case where the particles 203a, 203b, and 203c shown in FIG. 1B were approximated to a rectangular shape. In the particle 203a, a major diameter 206a was 352 nm, a minor diameter 207a was 108 nm, and the major diameter was 3.3 times longer than the minor diameter. In the particle 203b, a major diameter 206b was 490 nm, a minor diameter 207b was 97.9 nm, and the major diameter was 5.0 times longer than the minor diameter. In the particle 203c, a major diameter 206c was 280 nm, a minor diameter 207c was 125 nm, and the major diameter was 2.2 times longer than the minor diameter.

It is found that an excellent positive electrode active material with high aspect ratio and a small minor diameter can be obtained in Sample A1. On the other hand, the minor diameter of Sample C1 was more than or equal to 400 nm which is slightly large. There were conditions where the minor diameter of Sample C2 was as small as less than or equal to 100 nm; however, as will be described below, the specific surface area was large and the particles were probably in contact with each other.

<Particle Size Distribution Measurement with Laser Diffraction and Scattering Method>

Figure 29A:
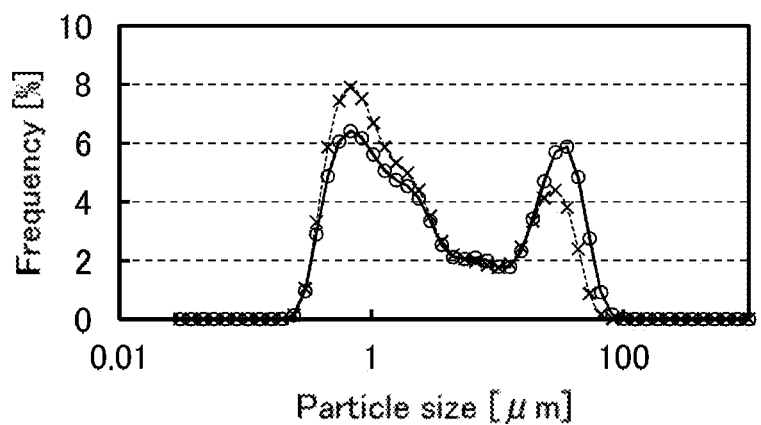
FIGS. 29A to 29C show results of particle size distribution measurement of the positive electrode active material.
Figure 29B:
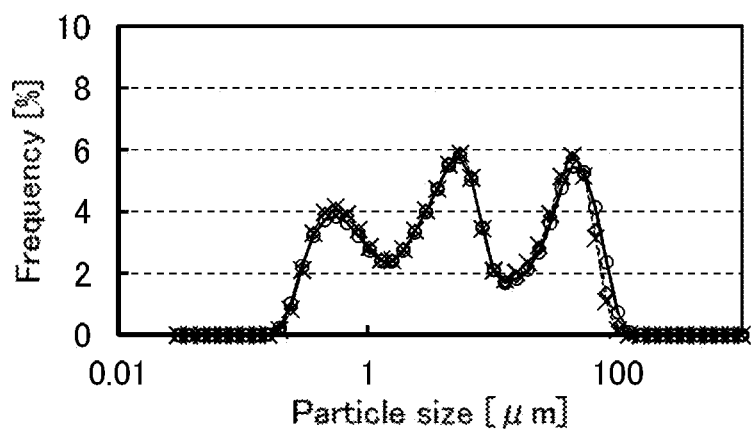
Figure 29C:
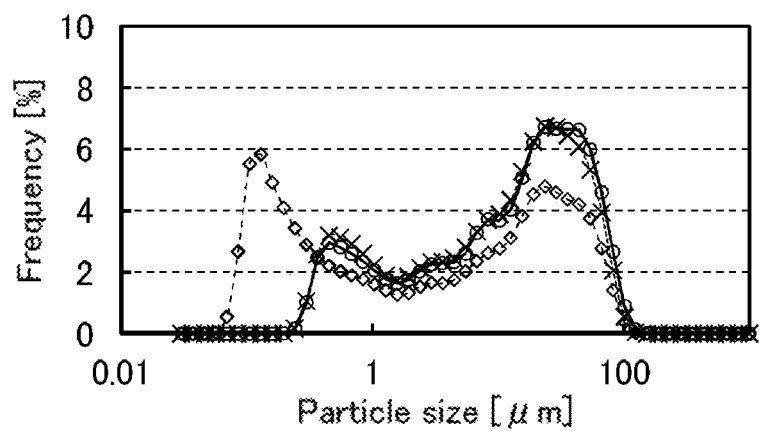

Next, each sample was measured using laser diffraction particle size analyzer (SALD-2200 manufactured by Shimadzu Corporation). A laser diffraction and scattering method was used as a method for calculating the particle diameter. The measurement area of the device was more than or equal to 0.030 μm and less than or equal to 1000 μm. The particle size distribution measurement results of Sample A1, Sample C1, and Sample C2 are shown in FIG. 29A, FIG. 29B, and FIG. 29C, respectively. Furthermore, the results of D50 and D90 of these samples are shown in Table 2. Here, D50 shows a particle diameter when accumulation of particles accounts for 50% of a particle size distribution curve in a measurement result of the particle size distribution. In other words, D50 is a median. Furthermore, D90 shows a particle diameter when accumulation of particles accounts for 90% of a particle size distribution curve in a measurement result of the particle size distribution. Note that in the case where the same sample name is shown more than once in Table 2, measurement was performed more than once using different powders.

TABLE 2

|    | D50 [μm] | D90 [μm] |
|----|----------|----------|
| A1 | 2.196    | 34.073   |
| A1 | 1.500    | 25.422   |
| C1 | 4.633    | 48.711   |
| C1 | 4.437    | 43.238   |
| C1 | 4.465    | 44.428   |
| C2 | 13.806   | 51.055   |
| C2 | 12.216   | 47.326   |
| C2 | 3.279    | 40.455   |

D50 in Sample C2 was more than 10 μm in some cases and such large values were larger than Samples A1 and C1 in Sample C2.

<Specific Surface Area Measurement>

Next, measurement of the specific surface area of each sample was performed. For the measurement of the specific surface area, a micromeritics automatic surface area and porosimetry analyzer (Tristar II3020 manufactured by Shimadzu Corporation) was used. BET was used for the analysis. Measurement results of the specific surface areas of the samples are shown in Table 3.

TABLE 3

|    | specific surface area [m²/g] |
|----|------------------------------|
| A1 | 20.6777                      |
| C1 | 13.7049                      |
| C2 | 8.2877                       |

Here, the density d=3.55 g/cm³ of $LiFePO_4$ was substituted to Formula (1) with use of the specific surface area of Table 3 to obtain the diameter in the case where Samples A1, C1, and C2 are approximated to a sphere shape; the calculated diameter of Sample A1 was 120 nm, that of Sample C1 was 181 nm, and that of Sample C2 was 299 nm.

As for Sample A1 formed with a formation temperature set to 180° C. and pH of the mixed solution C set to 4.28, the particle diameter obtained from the specific surface area was roughly equivalent to the particle size observed with SEM, which indicates that an excellent positive electrode active material with a small number of particles in contact with each other was obtained. On the other hand, despite the presence of a particle having a minor diameter less than or equal to 100 nm in observation with SEM in Sample C2 formed with a formation temperature set to 150° C. and pH of the mixed solution C set to 6.5 having a larger specific surface area when compared to other conditions, it is suggested that a larger number of particles are in contact with each other. Furthermore, it is suggested from the analysis results of the particle size distribution that the diameter of the group is large. Furthermore, the specific surface area of Sample C1 formed with a formation temperature set to 150° C. and pH of the mixed solution C set to 3.92 was larger than that of Sample C2. Hence, the adhesion between the particles is expected to be prevented by shifting pH to an acidic side (a further small pH in acid).

This application is based on Japanese Patent Application Serial No. 2016-135709 filed with Japan Patent Office on Jul. 8, 2016, the entire contents of which are hereby incorporated by reference.

What is claimed is:

1. A manufacturing method of a positive electrode active material comprising:
    a step of mixing a lithium compound, a phosphorus compound, and water to form a first mixed solution;
    a step of adjusting pH by adding a first aqueous solution to the first mixed solution to form a second mixed solution;
    a step of mixing an iron(II) compound with the second mixed solution to form a third mixed solution; and
    a step of heating the third mixed solution under a pressure higher than or equal to 0.1 MPa and lower than or equal to 2 MPa at a highest temperature higher than 150° C. and lower than or equal to 250° C. for less than 5 hours to form a fourth mixed solution,
    wherein the positive electrode active material comprises a secondary particle including a plurality of primary particles,
    wherein the plurality of primary particles comprises a first particle and a second particle,
    wherein the first aqueous solution is ammonium aqueous solution,
    wherein pH of the third mixed solution is more than or equal to 3.5 and less than or equal to 5.0,
    wherein each of the first particle and the second particle is a lithium-containing complex phosphate comprising one or more of iron, nickel, manganese, and cobalt,
    wherein each of the first particle and the second particle comprises a major diameter in a major axis and a minor diameter in a minor axis when observed with a microscope,
    wherein the major axes of the first particle and the second particle are substantially parallel to each other,
    wherein the major diameter of the first particle is two to six times larger than the minor diameter of the first particle and the minor diameter of the first particle is more than or equal to 20 nm and less than or equal to 130 nm, and
    wherein a median value of particle diameters of the plurality of particles obtained with use of laser diffraction and scattering method is more than or equal to 500 nm and less than or equal to 6 µm.

2. The manufacturing method of a positive electrode active material according to claim 1;
    wherein the positive electrode active material has an olivine structure.

3. The manufacturing method of a positive electrode active material according to claim 2;
    wherein the positive electrode active material is represented by $LiFePO_4$.

4. A manufacturing method of a positive electrode active material comprising:
    a step of mixing a lithium compound, a phosphorus compound, and water to form a first mixed solution;
    a step of adjusting pH by adding a first aqueous solution to the first mixed solution to form a second mixed solution;
    a step of mixing an iron(II) compound with the second mixed solution to form a third mixed solution; and
    a step of heating the third mixed solution under a pressure higher than or equal to 0.1 MPa and lower than or equal to 2 MPa at a highest temperature higher than 150° C. and lower than or equal to 250° C. for less than 5 hours to form a fourth mixed solution,
    wherein the positive electrode active material comprises a secondary particle including a plurality of primary particles,
    wherein the plurality of primary particles comprises a first particle and a second particle,
    wherein the first aqueous solution is ammonium aqueous solution,
    wherein pH of the third mixed solution is more than or equal to 3.5 and less than or equal to 5.0,
    wherein each of the first particle and the second particle is a lithium-containing complex phosphate comprising one or more of iron, nickel, manganese, and cobalt,
    wherein each of the first particle and the second particle comprises a major diameter in a major axis and a minor diameter in a minor axis when observed with a microscope,
    wherein the major axes of the first particle and the second particle are substantially parallel to each other,
    wherein the major diameter of the first particle is two to six times larger than the minor diameter of the first particle and the minor diameter of the first particle is more than or equal to 20 nm and less than or equal to 130 nm, and
    wherein a median value of particle diameters of the plurality of particles obtained with use of laser diffraction and scattering method is more than or equal to 500 nm and less than or equal to 6 µm, and
    wherein a specific surface area is more than or equal to 18 $m^2/g$ and less than or equal to 50 $m^2/g$.

5. The manufacturing method of a positive electrode active material according to claim 4;
    wherein the positive electrode active material has an olivine structure.

6. The manufacturing method of a positive electrode active material according to claim 5;
    wherein the positive electrode active material is represented by $LiFePO_4$.

* * * * *